(12) United States Patent
Nomura et al.

(10) Patent No.: US 7,177,060 B2
(45) Date of Patent: Feb. 13, 2007

(54) OPTICAL SCANNING APPARATUS AND IMAGE FORMING APPARATUS

(75) Inventors: Yujiro Nomura, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/014,519

(22) Filed: Dec. 15, 2004

(65) Prior Publication Data
US 2005/0157362 A1 Jul. 21, 2005

(30) Foreign Application Priority Data

Jan. 15, 2004 (JP) ............................ 2004-007515
Jan. 15, 2004 (JP) ............................ 2004-007516
Jan. 26, 2004 (JP) ............................ 2004-016714

(51) Int. Cl.
*G02B 26/08* (2006.01)

(52) U.S. Cl. .................................................... 359/212

(58) Field of Classification Search ........ 359/196–200, 359/201, 202, 203–226; 347/256, 257, 258, 347/259, 260
See application file for complete search history.

(56) References Cited

U.S. PATENT DOCUMENTS 5,793,515 A    8/1998  Sekikawa
6,038,051 A  *  3/2000  Suzuki et al. ............... 359/204
6,341,030 B1 *  1/2002  Takeshita et al. ........... 359/216
6,501,586 B1 * 12/2002  Takayama .................... 359/206
2002/0163702 A1* 11/2002  Hori et al. .................. 359/204
2003/0210445 A1  11/2003  Mori

FOREIGN PATENT DOCUMENTS

| EP | 1 339 211 | 8/2003 |
| JP | 11-218702 | 8/1999 |
| JP | 2003-043393 | 2/2003 |

* cited by examiner

Primary Examiner—Euncha P. Cherry
(74) Attorney, Agent, or Firm—Hogan & Hartson LLP

(57) ABSTRACT

The size Hbs of a beam spot of an incident light beam on a deflection mirror surface 651 is larger than the width Hb of the deflection mirror surface 651 when a pivot angle $\theta$ is zero, and therefore, Hbs>Hb is satisfied at any pivot angle $\theta$ and the deflection mirror surface 651 is overfilled with the incident light beam. Hence, even when beam rotation occurs, only a central portion of the incident light beam is reflected by the deflection mirror surface 651 and guided as a scanning light beam to a scanning lens. Owing to this, the central axis CLs of the outgoing light beam (scanning light beam) Ls from a deflector becomes close to the central axis CLs as it is when the pivot angle $\theta$ is zero.

10 Claims, 20 Drawing Sheets

FIG. 9A : PIVOT ANGLE θ=0°
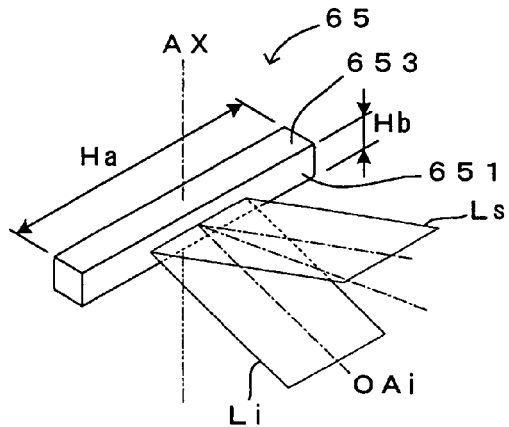
FIG. 9D : PIVOT ANGLE θ=+θmax°
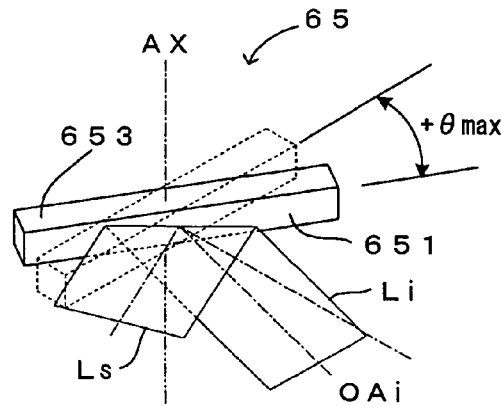
FIG. 9B : PIVOT ANGLE θ=0°
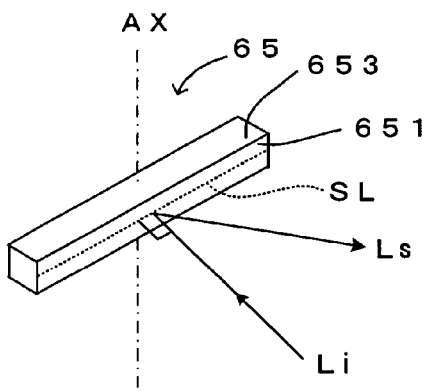
FIG. 9E : PIVOT ANGLE θ=+θmax°
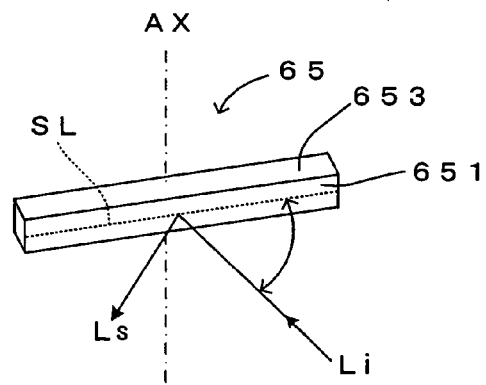
FIG. 9C : PIVOT ANGLE θ=0°
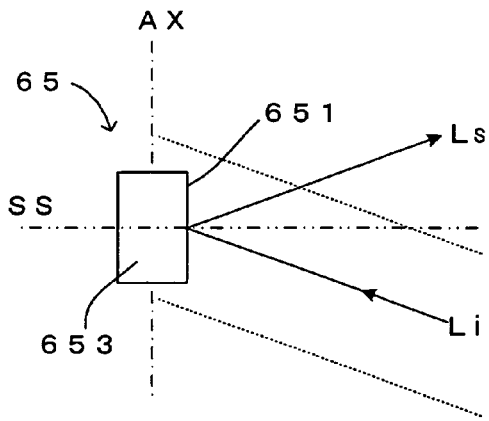
FIG. 9F : PIVOT ANGLE θ=+θmax°
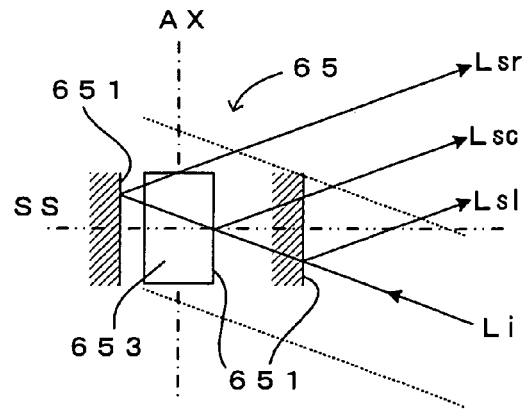

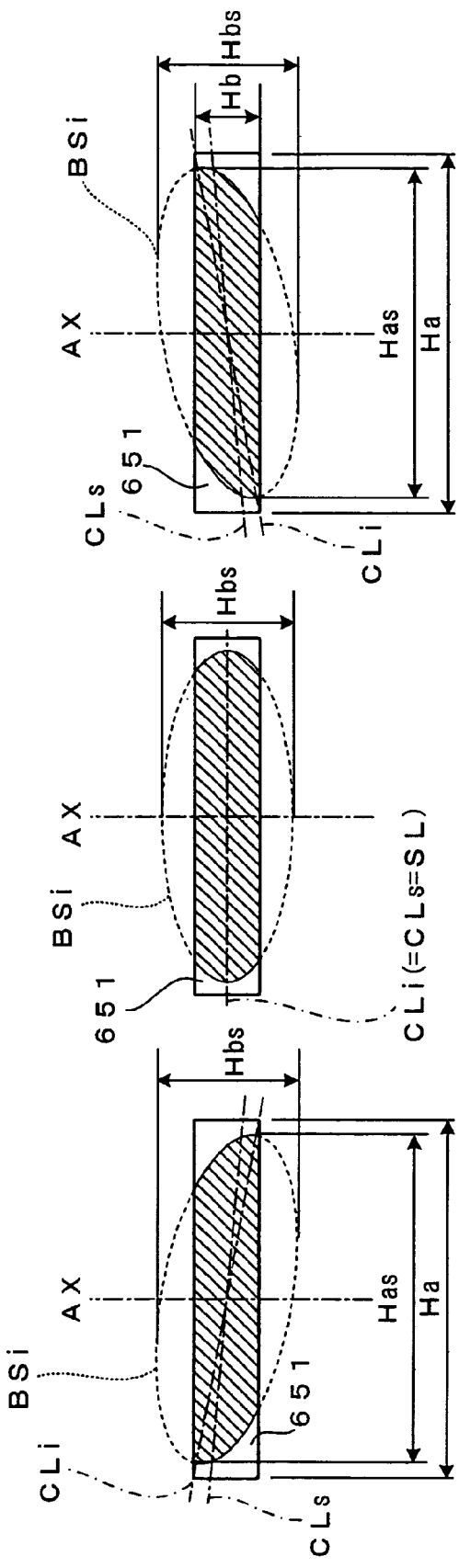

FIG. 12A: PIVOT ANGLE θ=0°
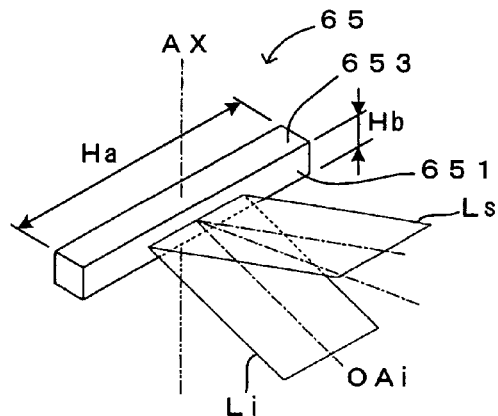
FIG. 12D: PIVOT ANGLE θ=+θmax°
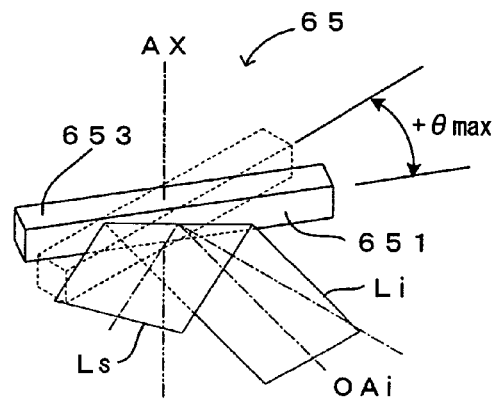
FIG. 12B: PIVOT ANGLE θ=0°
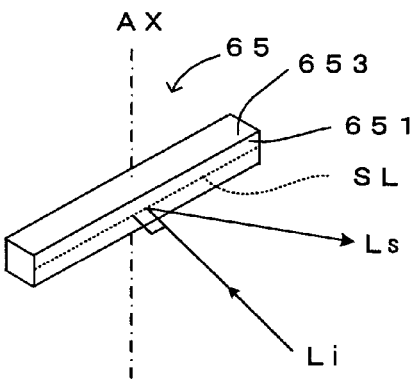
FIG. 12E: PIVOT ANGLE θ=+θmax°
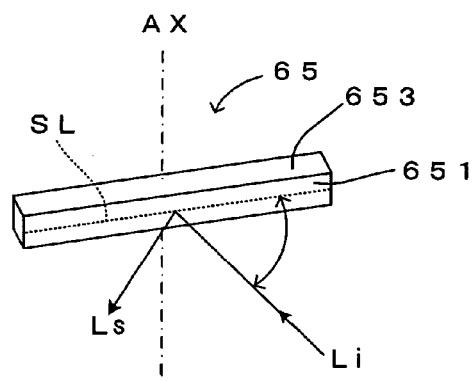
FIG. 12C: PIVOT ANGLE θ=0°
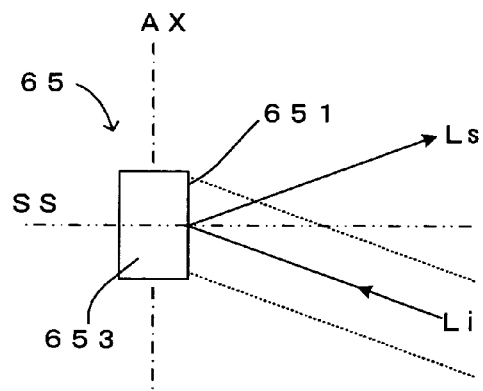
FIG. 12F: PIVOT ANGLE θ=+θmax°
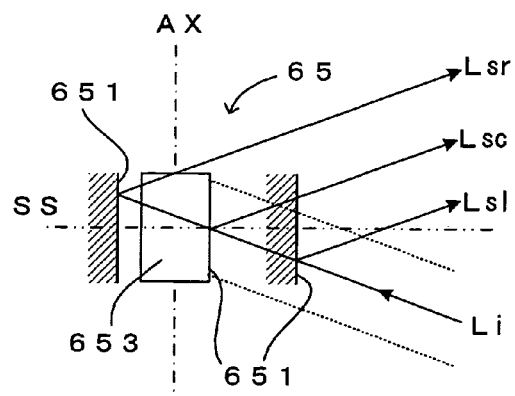

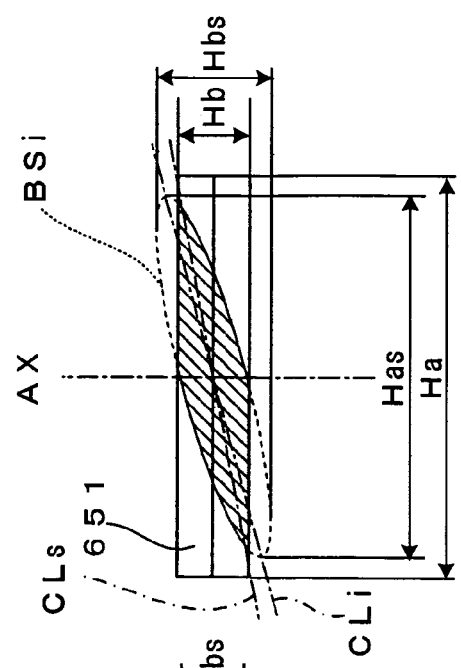
FIG. 13A: PIVOT ANGLE θ=+θmax
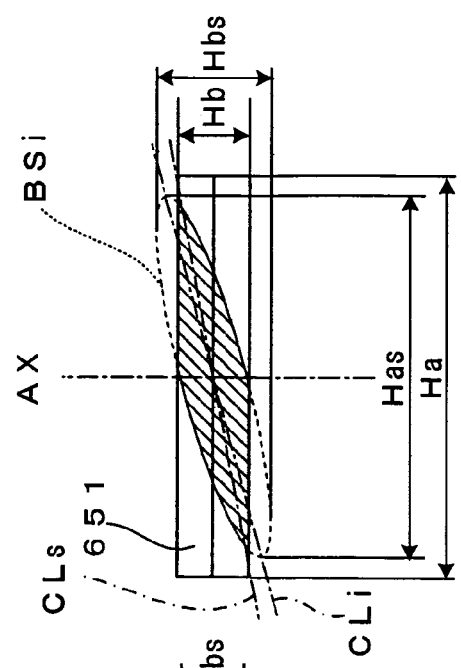
FIG. 13B: PIVOT ANGLE θ=0°
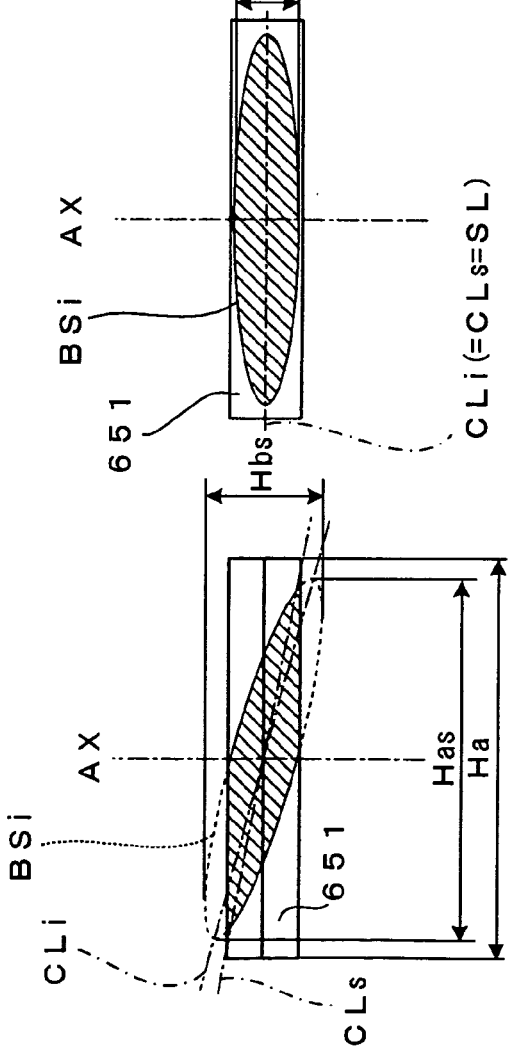
FIG. 13C: PIVOT ANGLE θ=−θmax FIG. 16A : PIVOT ANGLE θ=0°
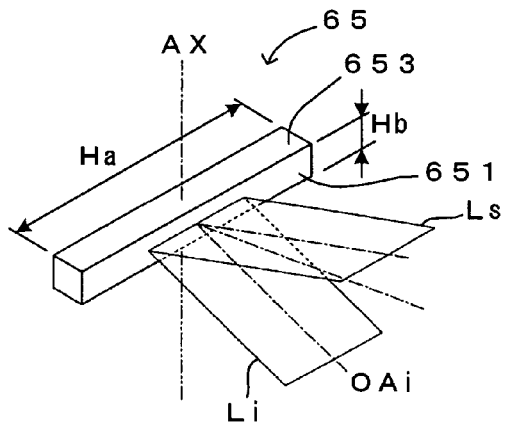
FIG. 16D : PIVOT ANGLE θ=+θmax°
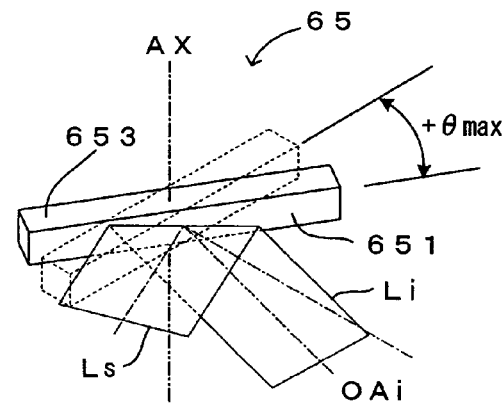
FIG. 16B : PIVOT ANGLE θ=0°
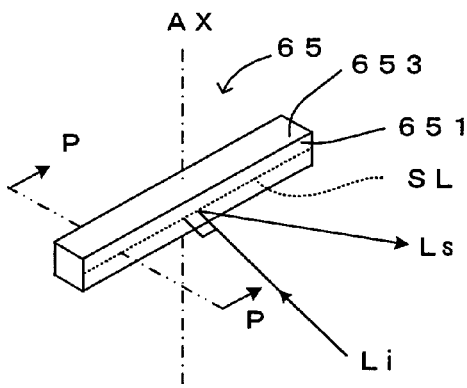
FIG. 16E : PIVOT ANGLE θ=+θmax°
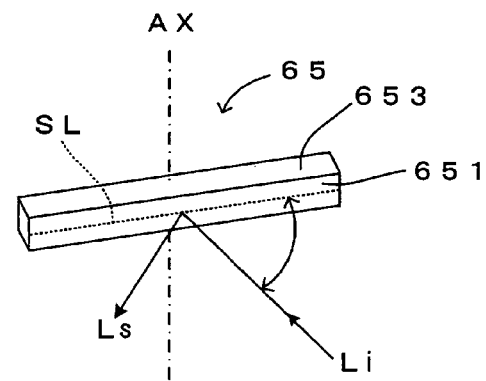
FIG. 16C : PIVOT ANGLE θ=0°
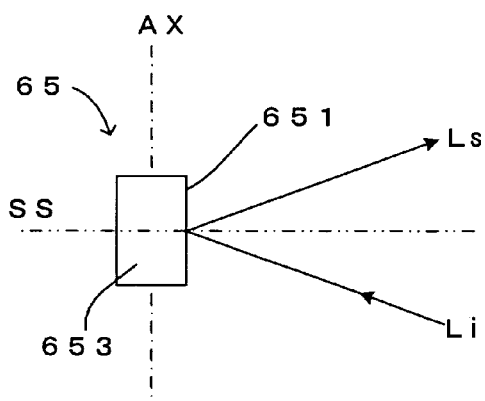
FIG. 16F : PIVOT ANGLE θ=+θmax°
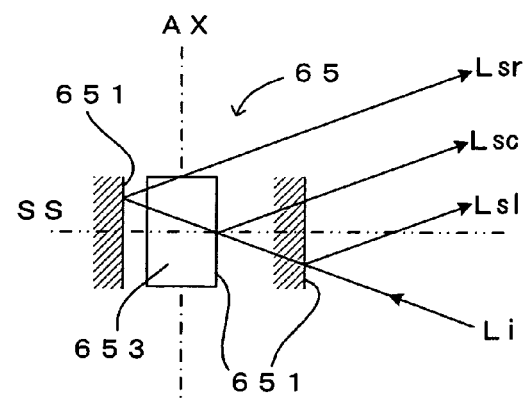

FIG. 17A : PIVOT ANGLE $\theta = -\theta\max$
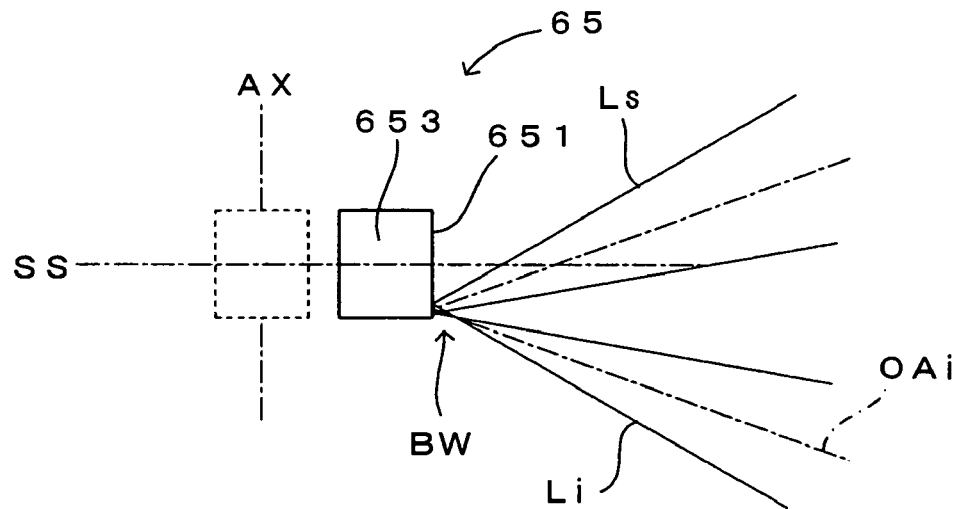
FIG. 17B : PIVOT ANGLE $\theta = 0°$
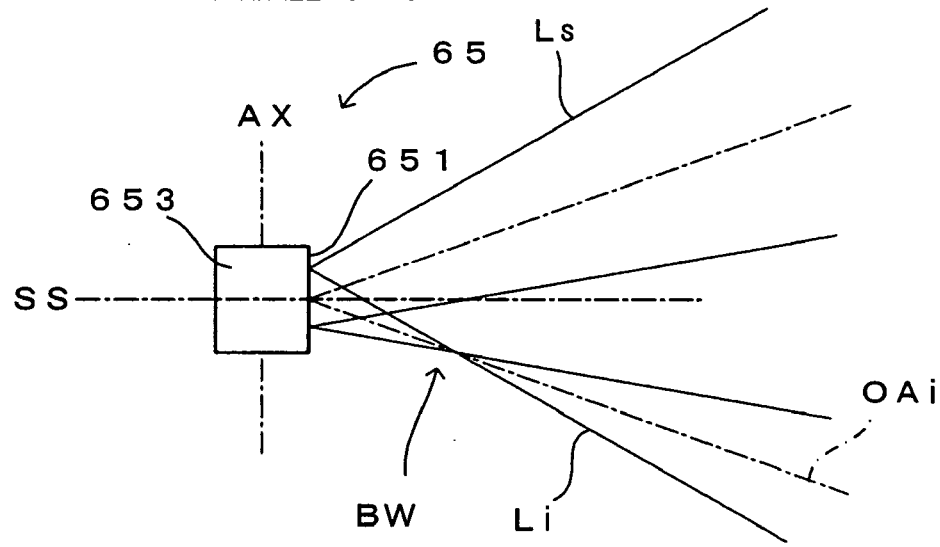
FIG. 17C : PIVOT ANGLE $\theta = +\theta\max$
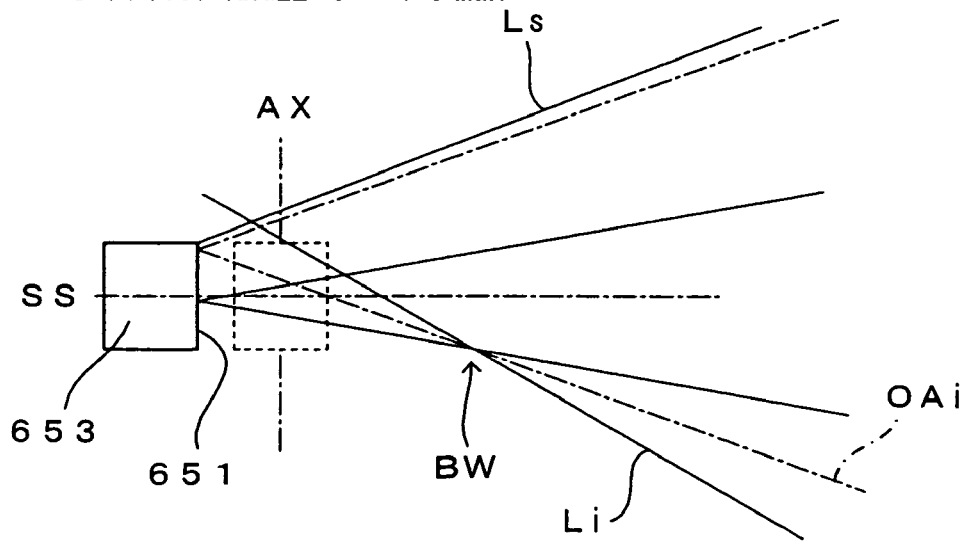

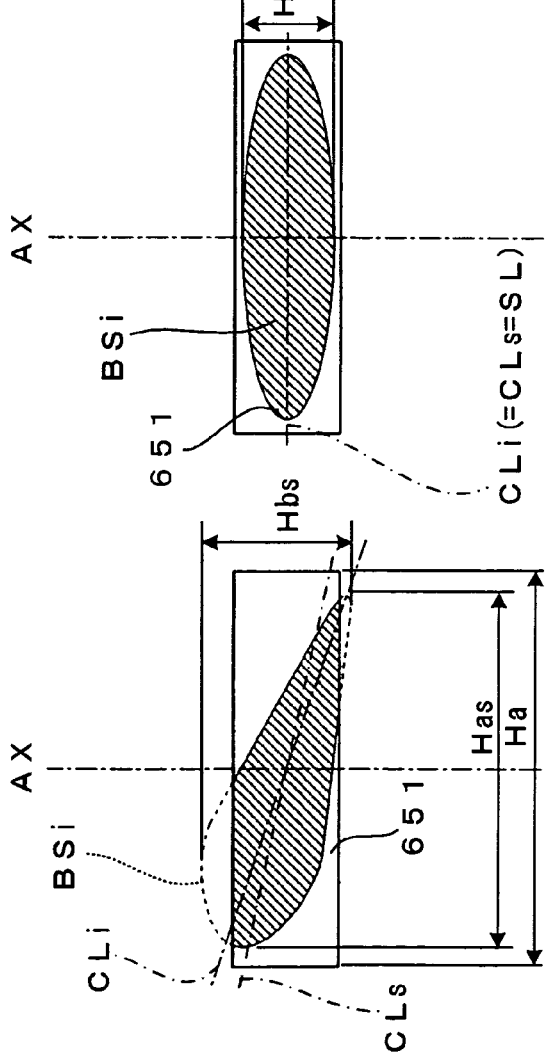
FIG. 18A: PIVOT ANGLE θ=+θmax
FIG. 18B: PIVOT ANGLE θ=0°
FIG. 18C: PIVOT ANGLE θ=−θmax FIG. 19A : PIVOT ANGLE θ=−θmax
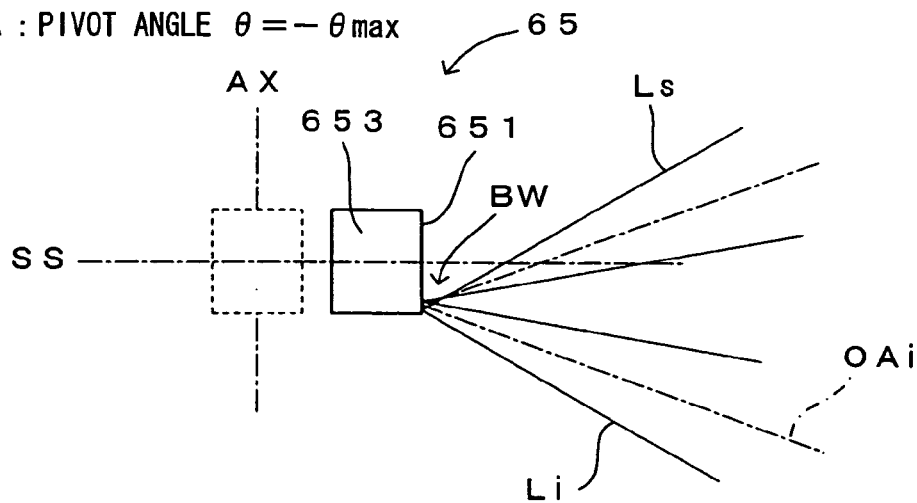
FIG. 19B : PIVOT ANGLE θ=0°
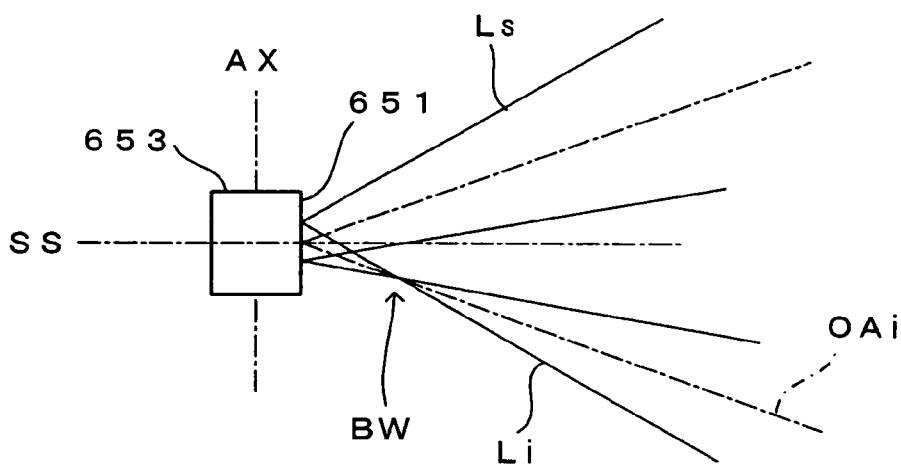
FIG. 19C : PIVOT ANGLE θ=+θmax
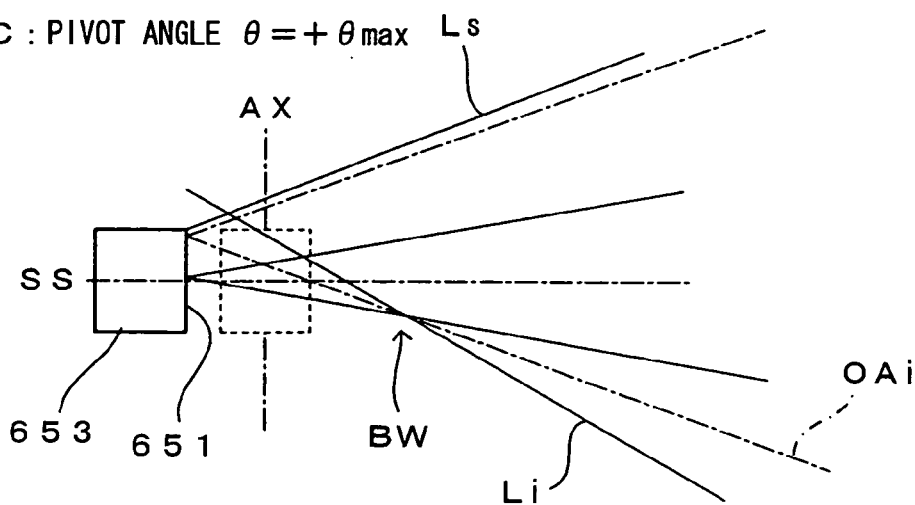

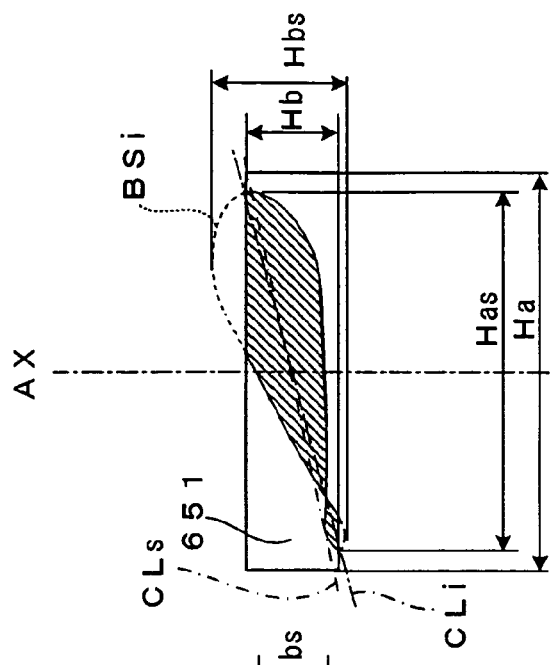
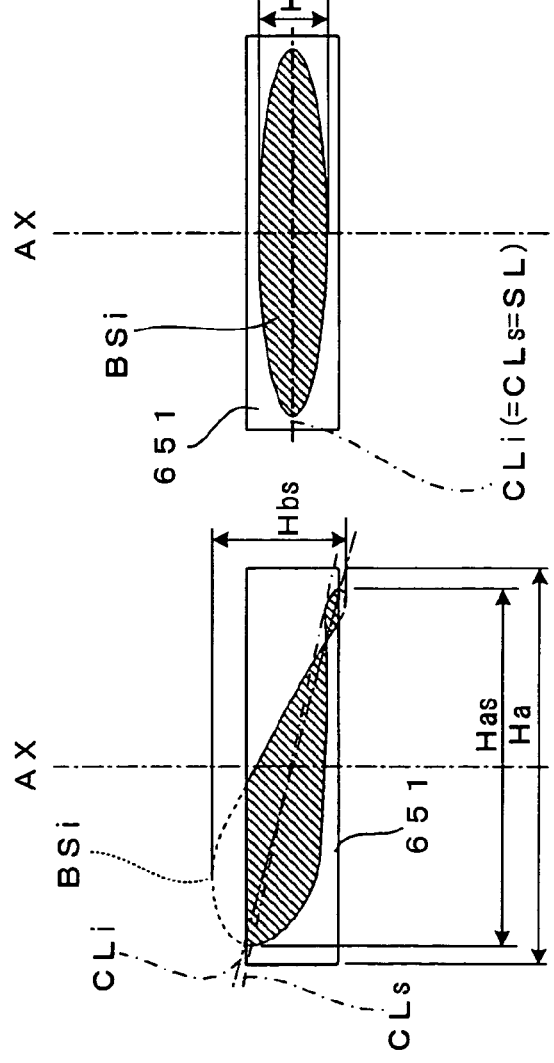

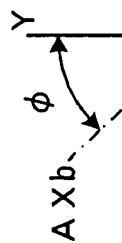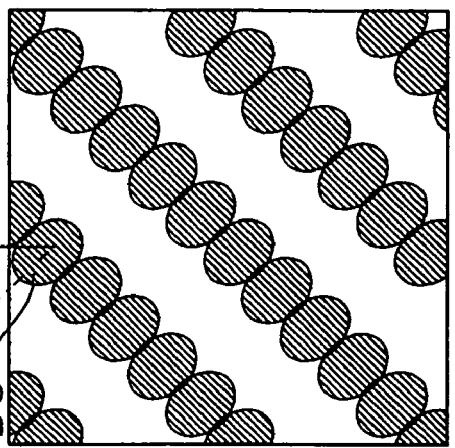
FIG. 21A: DEFLECTION ANGLE $\theta = +\theta_{max}$
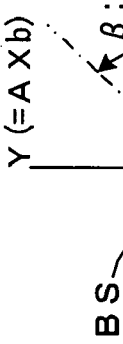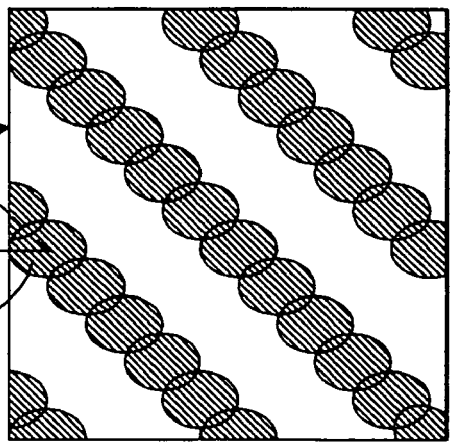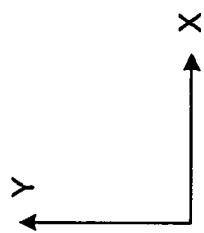
FIG. 21B: DEFLECTION ANGLE $\theta = 0°$
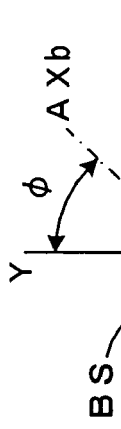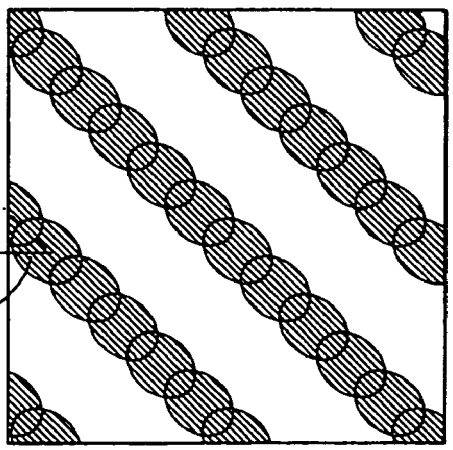
FIG. 21C: DEFLECTION ANGLE $\theta = -\theta_{max}$

OPTICAL SCANNING APPARATUS AND IMAGE FORMING APPARATUS

CROSS REFERENCE TO RELATED APPLICATION

The disclosure of Japanese Patent Applications enumerated below including specification, drawings and claims is incorporated herein by reference in its entirety:
No. 2004-007515 filed Jan. 15, 2004;
No. 2004-007516 filed Jan. 15, 2004; and
No. 2004-016714 filed Jan. 26, 2004.

BACKGROUND OF THE INVENTION

1. Field of the Invention

The present invention relates to an optical scanning apparatus which makes a light beam scan on a surface-to-be-scanned in a main scanning direction and an image forming apparatus which forms an electrostatic image using such an optical scanning apparatus.

2. Description of the Related Art

An apparatus which uses this type of optical scanning apparatus is an image forming apparatus such as a laser printer, a copier machine and a facsimile machine. For instance, in the apparatus described in Japanese Patent Application Laid-Open Gazette No. 2003-43393, a laser beam modulated in accordance with image data impinges upon a deflector via a collimator lens, a cylindrical lens and an aperture stop and is hence deflected. The specific structure is as follows.

In this optical scanning apparatus, the laser beam emitted from a semiconductor laser passes through the collimator lens and the cylindrical lens and is accordingly shaped so that the cross sectional shape of the laser beam becomes an elliptic shape which elongates in the main scanning direction. Within a sub-scanning cross sectional surface, this laser beam impinges upon a deflection mirror surface of the deflector at an angle in a sub scanning direction, that is, the laser beam makes an oblique incidence upon the deflection mirror surface. In addition, this apparatus uses a galvanometer mirror as the deflector which reciprocally vibrates about a central axis of vibrations in the main scanning direction within a scanning range between maximum amplitudes $\pm \theta$ max (deflection angle $\theta$: $-\theta$ max to $0°$ to $+\theta$ max), deflecting the laser beam which is incident upon the deflection mirror surface. The laser beam deflected in this manner forms an image through a corrected lens on a photosensitive drum surface (surface-to-be-scanned). An electrostatic image which reflects image data is thus formed on a photosensitive drum (which corresponds to the "latent image carrier" of the present invention).

SUMMARY OF THE INVENTION

By the way, in the case of an apparatus as described above in which a light beam obliquely incident upon a deflection mirror surface is deflected and made scan, a phenomenon that a beam spot BS formed on a surface-to-be-scanned rotates depending upon a deflection angle $\theta$ (beam rotation phenomenon) occurs as shown in FIGS. 21A through 21C for example. This is attributable to the oblique incidence, and when the deflection angle $\theta$ is zero, the central axis AXb of the beam spot BS formed on the surface-to-be-scanned is approximately parallel to a sub scanning direction Y (FIG. 21B). On the other hand, when the deflection angle $\theta$ reaches a maximum value ($+\theta$ max), the central axis AXb of the beam spot BS rotates a predetermined angle ($+\phi$) in the sub scanning direction as shown in FIG. 21A and when the deflection angle $\theta$ reaches a maximum value ($-\theta$ max), the central axis AXb of the beam spot BS rotates a predetermined angle ($-\phi$) in the sub scanning direction Y as shown in FIG. 21C. The angle $\beta$ shown in FIGS. 21A through 21C is a screen angle.

In the case of an optical scanning apparatus in which a light beam is obliquely incident upon a deflection mirror surface, a beam spot rotates depending upon the deflection angle and a scanning characteristic thus deteriorates. As a result, when such an optical scanning apparatus is used as an exposure unit of an image forming apparatus, the density of an image formed on a surface-to-be-scanned varies in the main scanning direction, which leads to a degraded image quality.

The present invention has been made in light of the problems above, and accordingly aims at providing an optical scanning apparatus which suppresses rotation of a beam spot on a surface-to-be-scanned associated with oblique incidence of a light beam upon a deflection mirror surface to thereby makes the light beam scan on the surface-to-be-scanned while exhibiting an excellent scanning characteristic, and an image forming apparatus which uses such an optical scanning apparatus.

According to a first aspect of the present invention, there is provided an optical scanning apparatus which makes a light beam scan on a surface-to-be-scanned in a main scanning direction, comprising: a deflector which comprises a deflection mirror surface reflecting an incident light beam, and displaces the deflection mirror surface about a drive axis which is approximately orthogonal to the main scanning direction, thereby deflecting the incident light beam in the main scanning direction; a light source which emits the light beam; a first optical system which shapes the light beam from the light source and makes the light beam impinge upon the deflection mirror surface at an acute angle with respect to a reference surface which is orthogonal to the drive axis; and a second optical system which makes the light beam form an image on the surface-to-be-scanned, wherein on the assumption that an intersecting line which is formed as the deflection mirror surface intersects the reference surface at the position of incidence of the incident light beam upon the deflection mirror surface is defined to be a reference line, and that a direction which is orthogonal to the reference line within the deflection mirror surface is defined to be a mirror width direction, the size of a spot of the incident light beam formed on the deflection mirror surface is larger than the width of the deflection mirror surface in the mirror width direction, when an optical axis of the incident light beam is orthogonal to the reference line.

According to a second aspect of the present invention, there is provided an optical scanning apparatus which makes a light beam scan on a surface-to-be-scanned in a main scanning direction, comprising: a deflector which comprises a deflection mirror surface reflecting an incident light beam, and displaces the deflection mirror surface about a drive axis which is approximately orthogonal to the main scanning direction, thereby deflecting the incident light beam in the main scanning direction within a predetermined range of scanning; a light source which emits the light beam; a first optical system which shapes the light beam from the light source and makes the light beam impinge upon the deflection mirror surface at an acute angle with respect to a reference surface which is orthogonal to the drive axis; and a second optical system which makes the light beam form an image on the surface-to-be-scanned, wherein on the assumption that an intersecting line which is formed as the deflection mirror surface intersects the reference surface at the position of incidence of the incident light beam upon the deflection mirror surface is defined to be a reference line, and that a direction which is orthogonal to the reference line within the deflection mirror surface is defined to be a mirror width direction, the size of a spot of the incident light beam formed on the deflection mirror surface in the mirror width direction is equal to or smaller than the width of the deflection mirror surface in the mirror width direction, within the range of scanning and when an angle between an optical axis of the incident light beam and the reference line is a right angle, and the size of a spot of the incident light beam formed on the deflection mirror surface in the mirror width direction is larger than the width of the deflection mirror surface in the mirror width direction, within the range of scanning and when the angle there-between reaches a maximum value or a minimum value.

According to a third aspect of the present invention, there is provided an optical scanning apparatus which makes a light beam scan on a surface-to-be-scanned in a main scanning direction, comprising: a deflector which comprises a deflection mirror surface reflecting an incident light beam, and displaces the deflection mirror surface about a drive axis which is approximately orthogonal to the main scanning direction, thereby deflecting the incident light beam in the main scanning direction within a predetermined range of scanning; a light source which emits the light beam; a first optical system which converges the light beam from the light source in a sub scanning direction which is approximately orthogonal to the main scanning direction, and makes the light beam impinge upon the deflection mirror surface at an acute angle with respect to a reference surface which is orthogonal to the drive axis; and a second optical system which makes the light beam form an image on the surface-to-be-scanned, wherein on the assumption that an intersecting line which is formed as the deflection mirror surface intersects the reference surface at the position of incidence of the incident light beam upon the deflection mirror surface is defined to be a reference line, and that a direction which is orthogonal to the reference line within the deflection mirror surface is defined to be a mirror width direction, the size of a spot of the incident light beam formed on the deflection mirror surface in the mirror width direction is equal to or smaller than the width of the deflection mirror surface in the mirror width direction, within the range of scanning and when an angle between an optical axis of the incident light beam and the reference line is a right angle, and the size of a spot of the incident light beam formed on the deflection mirror surface in the mirror width direction is larger than the width of the deflection mirror surface in the mirror width direction, within the range of scanning and when the angle there-between reaches a maximum value or a minimum value.

According to a fourth aspect of the present invention, there is provided an image forming apparatus, comprising: the optical scanning apparatus; and a latent image carrier, wherein the optical scanning apparatus makes the light beam scan on a surface of the latent image carrier, thereby forming an electrostatic latent image on the latent image carrier.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 9A through 9F are drawings which show how the deflector makes the light beam scan.

FIGS. 10A through 10C are drawings which show the shape of a spot of the incident light beam on the deflection mirror surface.

FIGS. 12A through 12F are drawings which show how the deflector makes a light beam scan in the second embodiment.

FIGS. 13A through 13C are drawings which show the shape of a spot of the incident light beam on the deflection mirror surface in the second embodiment.

FIGS. 16A through 16F are drawings which show how the deflector makes a light beam scan in the third embodiment.

FIGS. 17A through 17C are drawings which show reflection of a light beam on the deflection mirror surface as viewed from the line P—P which is shown in FIG. 16B.

FIGS. 18A through 18C are drawings which show the shape of a spot of the light beam on the deflection mirror surface in the third embodiment.

FIGS. 19A through 19C are drawings of a portion of an exposure unit which is disposed to an image forming apparatus according to a fourth embodiment of the present invention, showing reflection of a light beam on the deflection mirror surface as viewed from the line P—P which is shown in FIG. 16B.

FIGS. 20A through 20C are drawings which show the shape of a spot of the light beam on the deflection mirror surface in the fourth embodiment.

FIGS. 21A through 21C are schematic drawings which show beam rotation on a surface-to-be-scanned.

DETAILED DESCRIPTION OF THE PREFERRED EMBODIMENTS

<First Preferred Embodiment>

Figure 1:
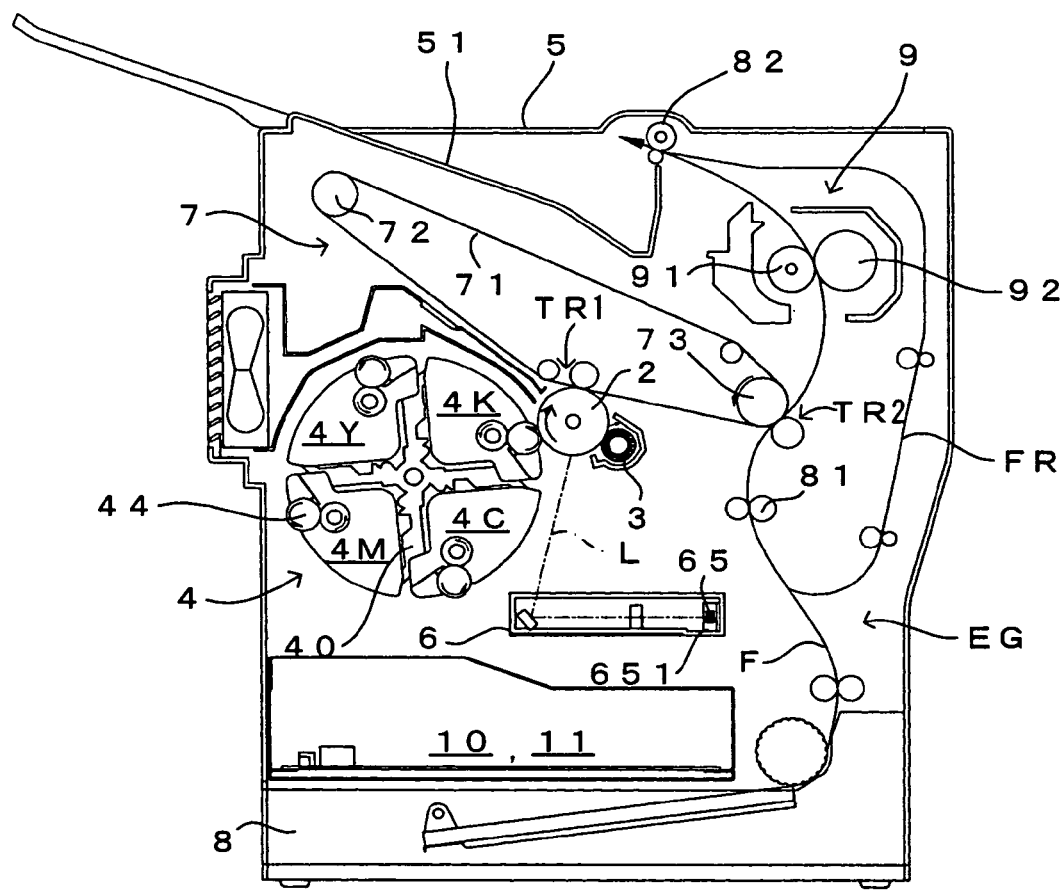
FIG. 1 is a drawing which shows a first embodiment of an image forming apparatus according to the present invention.
Figure 2:
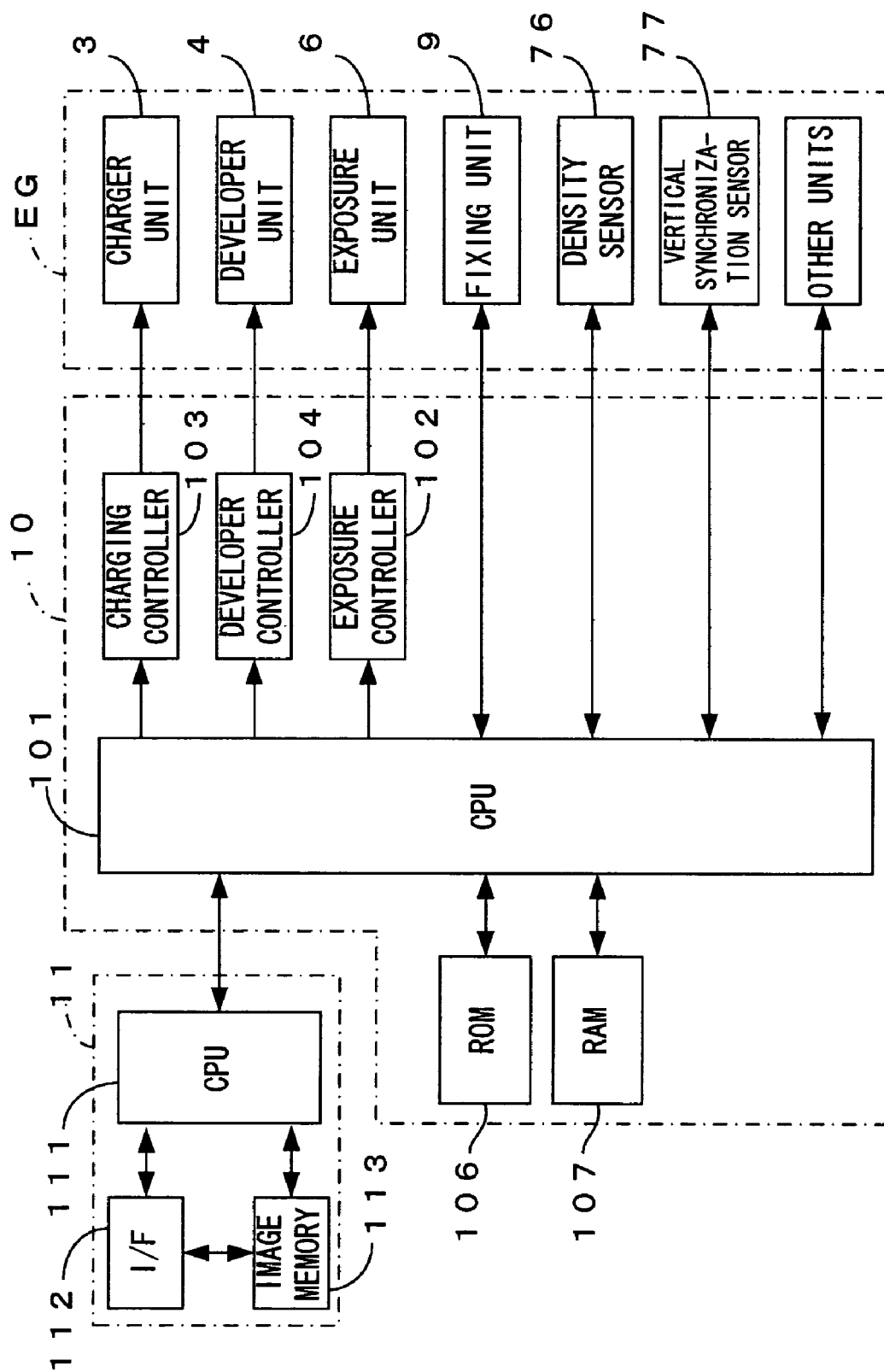
FIG. 2 is a block diagram which shows the electric structure of the image forming apparatus which is shown in FIG. 1.

FIG. 1 is a drawing which shows a first embodiment of an image forming apparatus according to the present invention. FIG. 2 is a block diagram which shows the electric structure of the image forming apparatus which is shown in FIG. 1.

This image forming apparatus is a color printer of the so-called 4-cycle type. In this image forming apparatus, when a print command is fed to a main controller 11 from an external apparatus such as a host computer in response to a user's image formation request, an engine controller 10 controls respective portions of an engine part EG in accordance with the print instruction received from the main controller 11 of a CPU 111, and an image which corresponds to the print instruction is formed on a sheet which may be a copy paper, a transfer paper, a plain paper or a transparency for an overhead projector.

In the engine part EG, a photosensitive member 2 is disposed so that the photosensitive member 2 can freely rotate in the arrow direction (sub scanning direction) shown in FIG. 1. Around the photosensitive member 2, a charger unit 3, a rotary developer unit 4 and a cleaner (not shown) are disposed along the direction in which the photosensitive member rotates. A charging controller 103 is electrically connected with the charger unit 3, for application of a predetermined charging bias upon the charger unit 3. The bias application uniformly charges an outer circumferential surface of the photosensitive member 2 to a predetermined surface potential. The photosensitive member 2, the charger unit 3 and the cleaner form one integrated photosensitive member cartridge which can be freely attached to and detached from a main section 5 of the apparatus as one integrated unit.

An exposure unit 6 emits a light beam L toward the outer circumferential surface of the photosensitive member 2 thus charged by the charger unit 3. The exposure unit 6 makes the light beam L scan on the photosensitive member 2 based on an electric signal from an exposure controller which will be described later, whereby an electrostatic image which reflects an image signal is formed. The exposure unit 6 is thus an optical scanning apparatus according to the present invention, and the structure and operations of the exposure unit will be described in detail later.

The developer unit 4 develops thus formed electrostatic latent image with toner. In other words, in this embodiment, the developer unit 4 comprises a support frame 40 which is axially disposed for free rotations, and also a yellow developer 4Y, a magenta developer 4M, a cyan developer 4C and a black developer 4K which house toner of the respective colors and are formed as cartridges which are freely attachable to and detachable from the support frame 40. The developer unit 4 is driven into rotations in response to a control command given from a developer controller 104 of the engine controller 10. When the developers 4Y, 4C, 4M and 4K are selectively positioned at a predetermined developing position which abuts on the photosensitive member 2 or is faced with the photosensitive member 2 over a predetermined gap, toner of the color corresponding to the selected developer is supplied onto the surface of the photosensitive member 2 by a developer roller 44 which carries the toner of the selected color. As a result, the electrostatic latent image on the photosensitive member 2 is visualized in the selected toner color.

A toner image developed by the developer unit 4 in the manner above is primarily transferred onto an intermediate transfer belt 71 of a transfer unit 7 in a primary transfer region TR1. The transfer unit 7 comprises the intermediate transfer belt 71 which runs across a plurality of rollers 72, 73, etc., and a driver (not shown) which drives the roller 73 into rotations to thereby rotate the intermediate transfer belt 71 in a predetermined rotation direction.

Further, there are a transfer belt cleaner (not shown), a density sensor 76 (FIG. 2) and a vertical synchronization sensor 77 (FIG. 2) in the vicinity of the roller 72. Of these, the density sensor 76 is disposed facing a surface of the intermediate transfer belt 71 and measures the optical density of a patch image formed on an outer circumferential surface of the intermediate transfer belt 71. Meanwhile, the vertical synchronization sensor 77 is a sensor which detects a reference position of the intermediate transfer belt 71, and serves as a vertical synchronization sensor for obtaining a synchronizing signal outputted in relation to rotations of the intermediate transfer belt 71 in the sub scanning direction, namely, a vertical synchronizing signal Vsync. In this apparatus, for the purpose of aligning the timing at which the respective portions operate and accurately overlaying toner images of the respective colors on top of each other, the respective portions of the apparatus operate under the control of the vertical synchronizing signal Vsync.

For transfer of color images on sheets, the toner images of the respective colors formed on the photosensitive member 2 are overlaid each other on the intermediate transfer belt 71, thereby forming color images which will then be secondarily transferred onto sheets taken out one by one from a cassette 8 and transported on a transportation path F to a secondary transfer region TR2.

At this stage, in order to properly transfer the images carried by the intermediate transfer belt 71 onto a sheet at a predetermined position, the timing of feeding the sheet to the secondary transfer region TR2 is controlled. To be specific, there is a gate roller 81 disposed in front of the secondary transfer region TR2 on the transportation path F, and as the gate roller 81 rotates in synchronization to the timing of rotations of the intermediate transfer belt 71, the sheet is fed into the secondary transfer region TR2 at predetermined timing.

Further, the sheet now bearing the color image is transported to a discharge tray part 51, which is disposed to a top surface portion of the main section 5 of the apparatus, through a fixing unit 9 and a discharge roller 82. When images are to be formed on the both surfaces of a sheet, the discharge roller 82 moves the sheet seating an image on its one surface in the manner above in a switch back motion. The sheet is therefore transported along a reverse transportation path FR. While the sheet is returned back to the transportation path F again before arriving at the gate roller 81, the surface of the sheet which abuts on the intermediate transfer belt 71 in the secondary transfer region TR2 and is to receive a transferred image is, at this stage, the opposite surface to the surface which already bears the image. In this fashion, it is possible to form images on the both surfaces of the sheet.

In FIG. 2, denoted at 113 is an image memory disposed in the main controller 11 for storage of image data fed from an external apparatus such as a host computer via an interface 112. Denoted at 106 is a ROM which stores a computation program executed by a CPU 101, control data for control of the engine part EG, etc. Denoted at 107 is a RAM which temporarily stores a computation result derived by the CPU 101, other data, etc.

Figure 3:
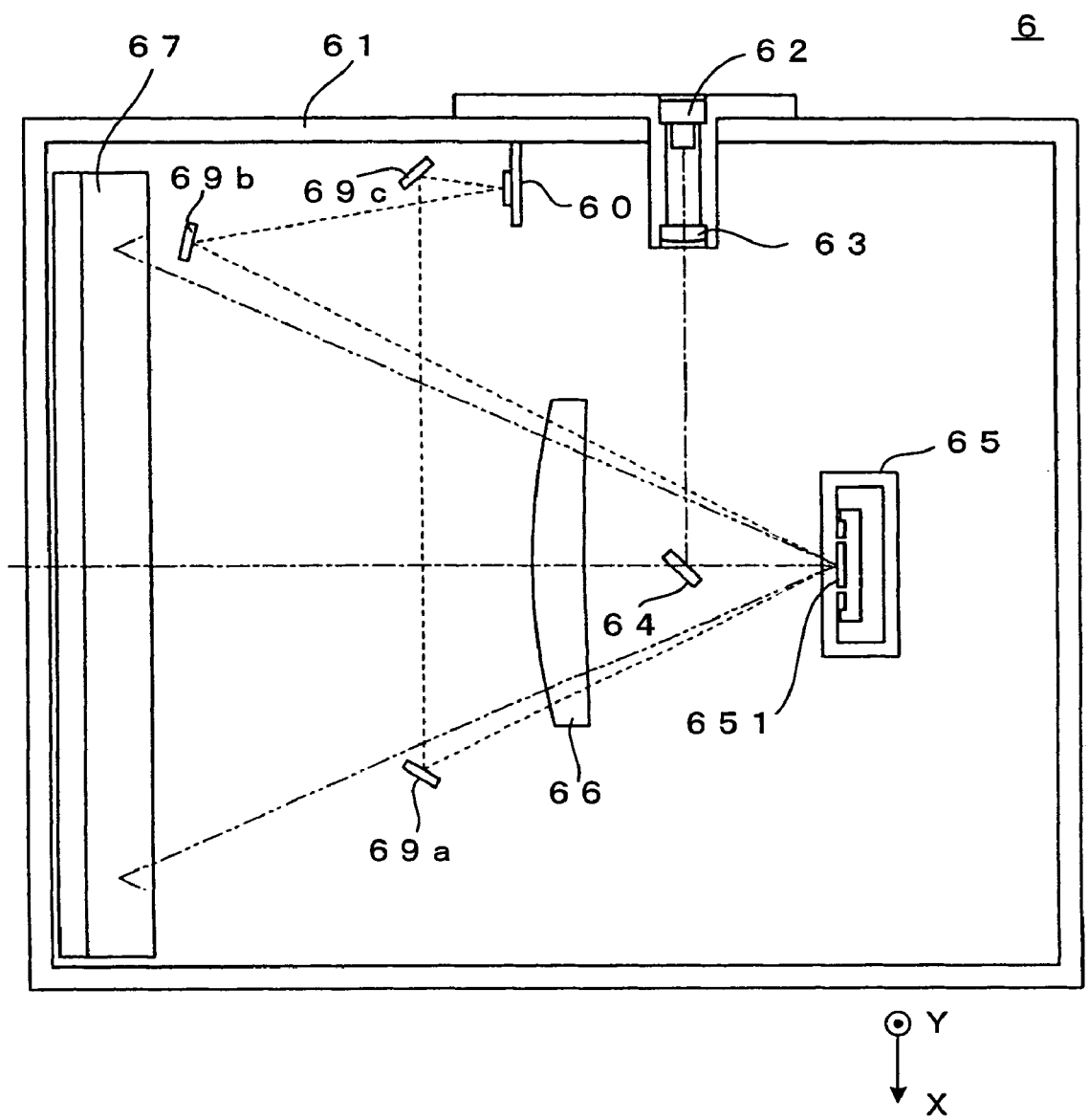
FIG. 3 is a main-scanning cross sectional view showing the structure of an exposure unit which is disposed in the image forming apparatus which is shown in FIG. 1.
Figure 4:
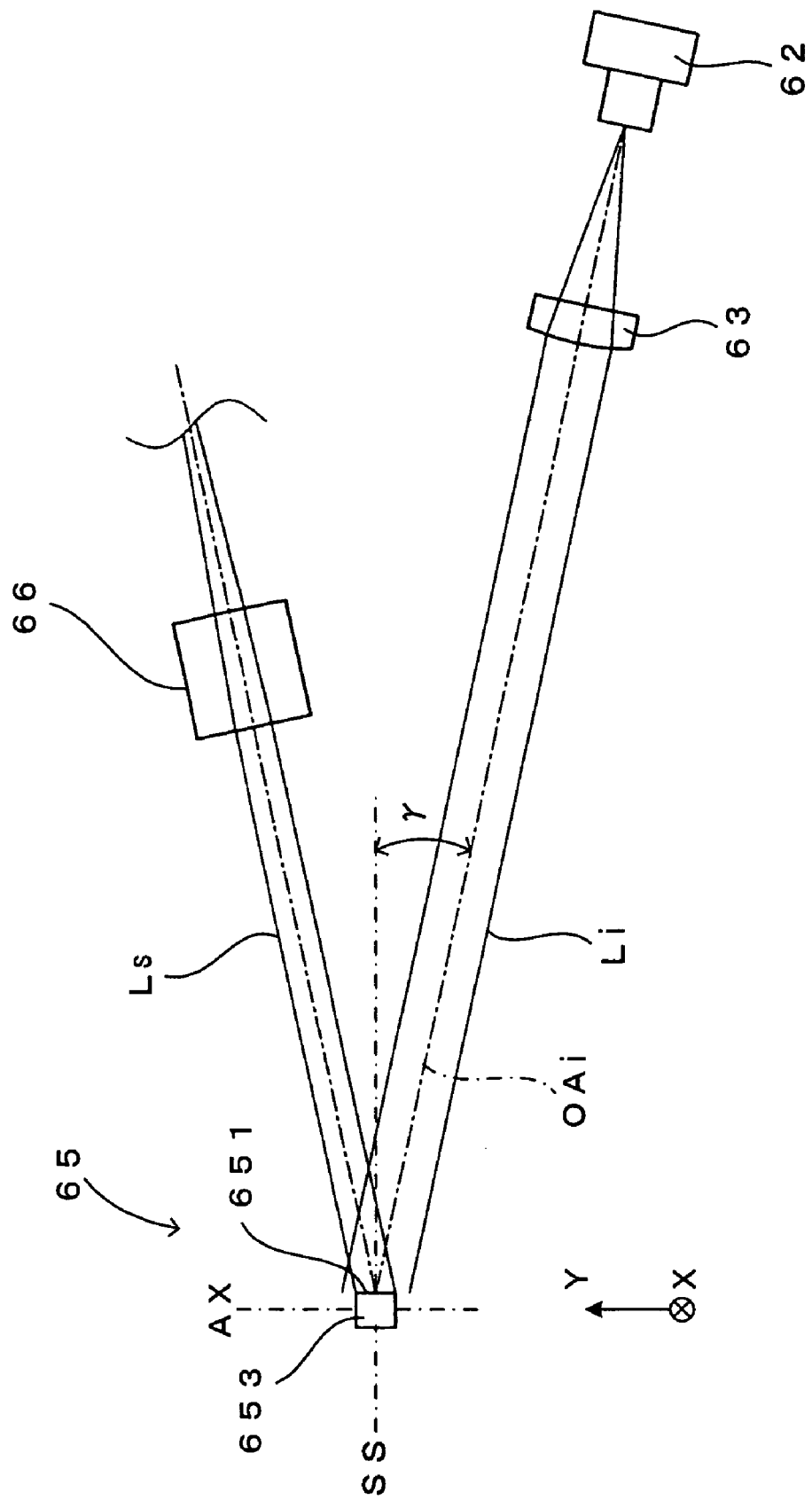
FIG. 4 is a sub-scanning cross sectional view of the exposure unit.
Figure 5:
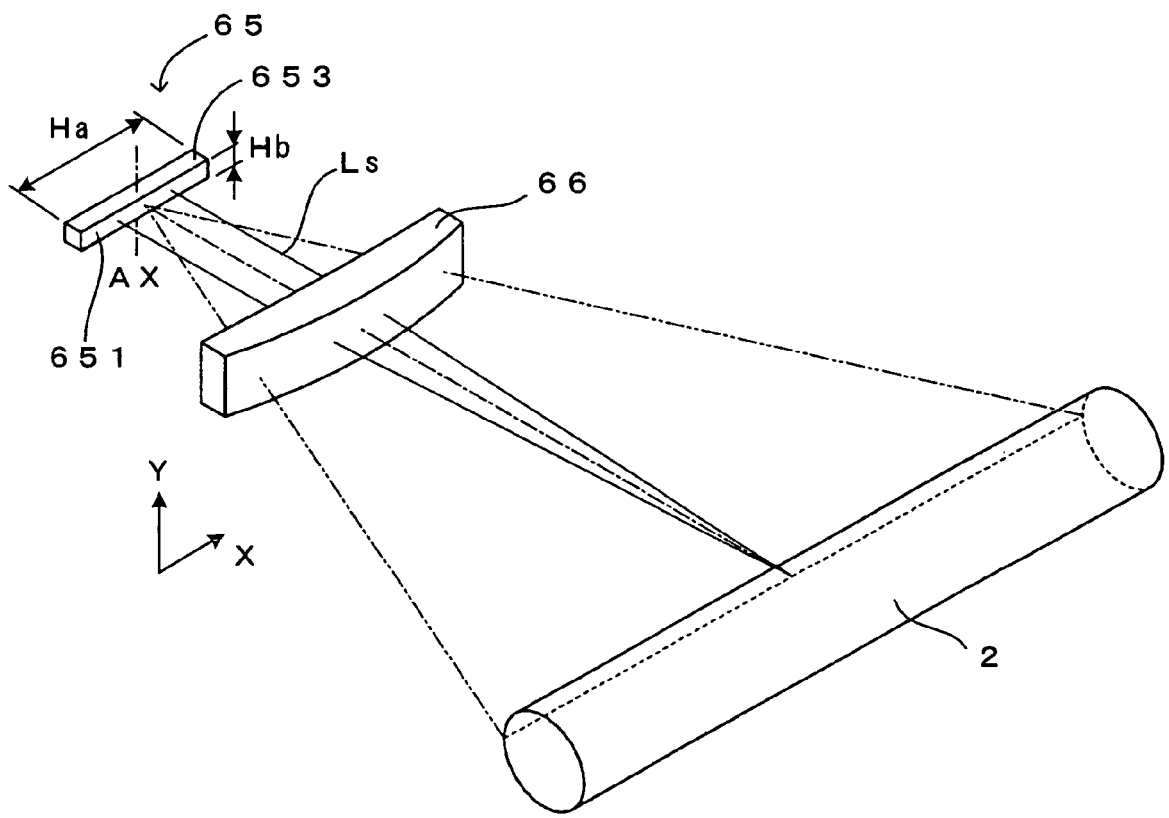
FIG. 5 is a perspective view which shows imaging of a scanning light beam.
Figure 6:
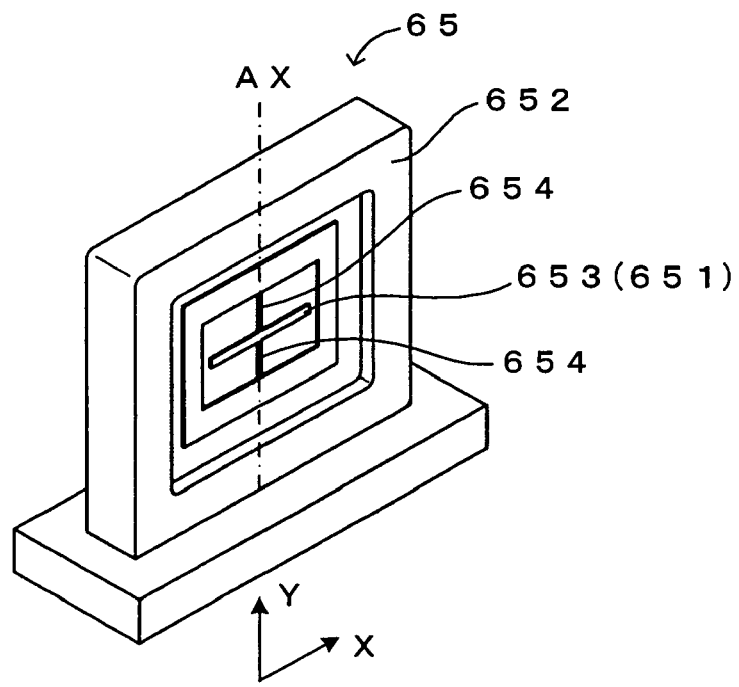
FIGS. 6 and 7 are drawings of a deflector which is one of components which form the exposure unit.
Figure 7:
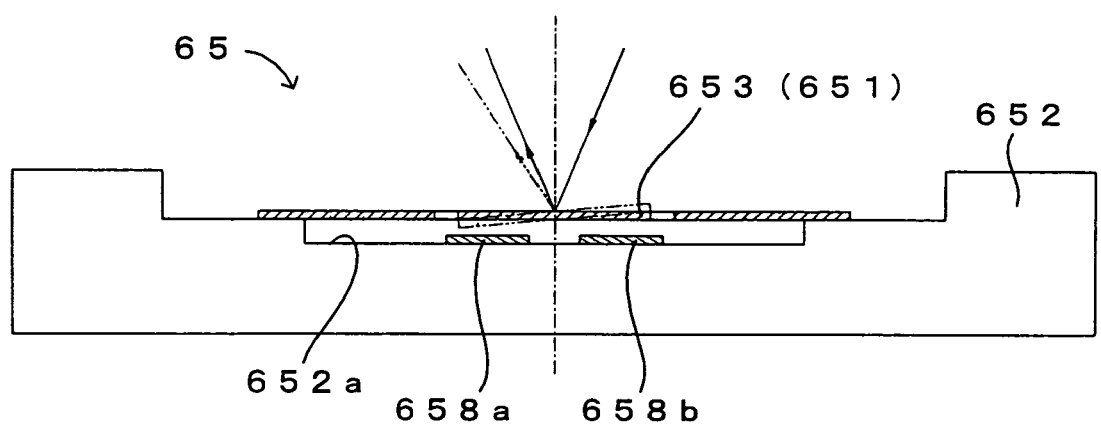
Figure 8:
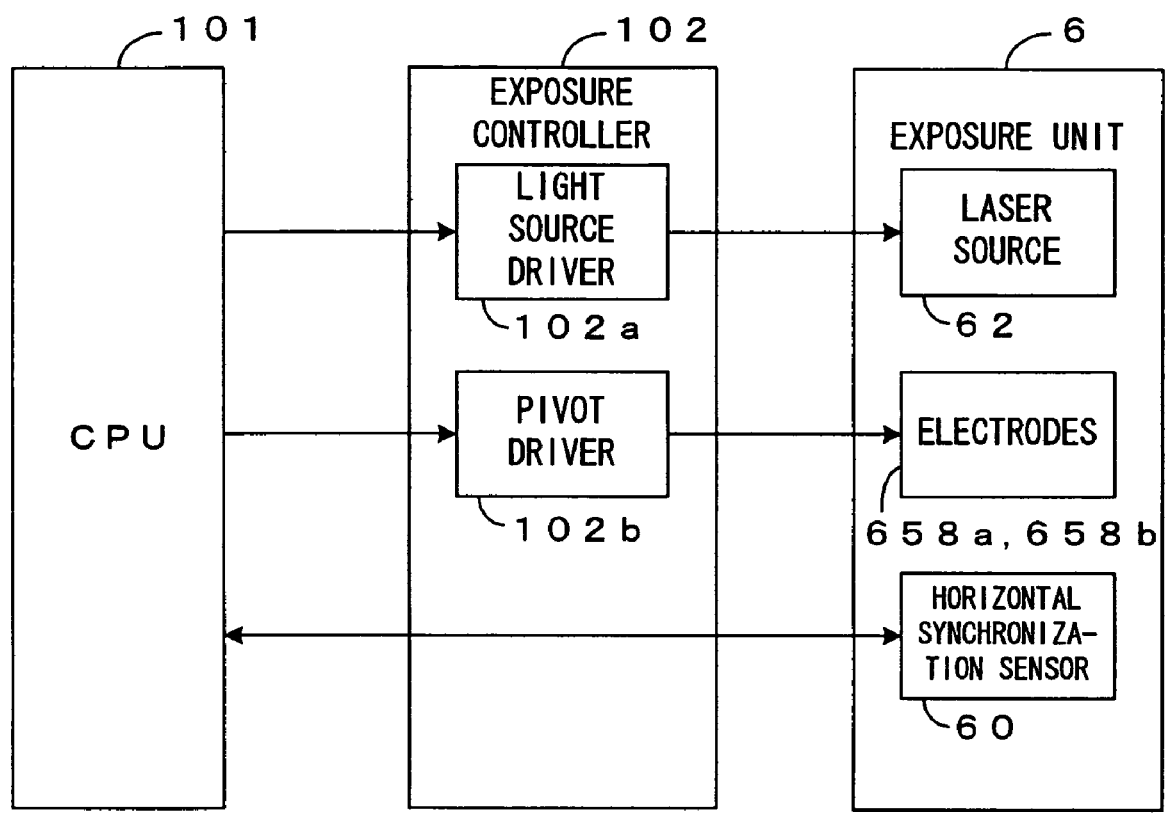
FIG. 8 is a block diagram which shows the structures of the exposure unit and the exposure controller.

FIG. 3 is a main-scanning cross sectional view showing the structure of the exposure unit which is disposed in the image forming apparatus which is shown in FIG. 1. FIG. 4 is a sub-scanning cross sectional view of the exposure unit. FIG. 5 is a perspective view which shows imaging of a scanning light beam. FIGS. 6 and 7 are drawings of a deflector which is one of components which form the exposure unit. FIG. 8 is a block diagram which shows the structures of the exposure unit and the exposure controller.

The structure and operations of the exposure unit 6 will now be described in detail with reference to these drawings.

The exposure unit 6 comprises an exposure housing 61. A single laser source 62 is fixed to the exposure housing 61, permitting emission of a light beam from the laser source 62. The laser source 62 is electrically connected with a light source driver 102a of an exposure controller 102 as shown in FIG. 8. Hence, the light source driver 102a controls ON and OFF of the laser source 62 in accordance with image data, and the laser source 62 emits a light beam modulated in accordance with the image data. The laser source 62 thus functions as the "light source" of the present invention.

Further, to make the light beam from the laser source 62 scan and expose the surface of the photosensitive member 2 (surface-to-be-scanned), a collimator lens (first optical system) 63, a mirror 64, a deflector 65, a scanning lens 66 and a return mirror 67 are disposed inside the exposure housing 61. In other words, after shaped into collimated light of a proper size by the collimator lens 63, the light beam from the laser source 62 impinges upon a deflection mirror surface 651 at an acute angle γ with respect to a reference surface SS which is orthogonal to a pivot axis (which corresponds to the "drive axis" of the present invention) AX of the deflection mirror surface 651 of the deflector 65 as shown in FIG. 4.

The deflector 65 is made using a micro machining technique which is an application of semiconductor manufacturing techniques and which aims at forming an integrated micro machine on a semiconductor substrate, and therefore, the deflector 65 is capable of deflecting a light beam reflected by the deflection mirror surface 651 in the main scanning direction X. To be more specific, the deflector 65 has the following structure.

As shown in FIGS. 6 and 7, in the deflector 65, a single crystal substrate of silicon (hereinafter referred to merely as a "silicon substrate") 652 functions as the "support member" of the present invention, and a movable plate 653 is obtained by partially processing the silicon substrate 652. The movable plate 653 is elastically supported to the silicon substrate 652 by torsion springs 654 and capable of freely pivoting about the pivot axis AX which elongates in the sub scanning direction Y which is approximately orthogonal to the main scanning direction X. Further, in a central portion of the movable plate 653, an aluminum film or the like is disposed as the deflection mirror surface 651. In this embodiment, the movable plate 653 is finished in the shape of an elongated strip which extends in the main scanning direction X as shown in FIG. 6.

In addition, a recess 652a is formed in an approximately central portion of the silicon substrate 652, as shown in FIG. 7, so that the movable plate 653 can pivot around the pivot axis AX. In the inner bottom surface of the recess 652a, electrodes 658a and 658b are fixed at locations opposed against the both ends of the movable plate 653 (FIG. 7). These two electrodes 658a and 658b function as electrodes which are for driving the movable plate 653 into the pivoting action about the pivot axis AX. In short, the electrodes 658a and 658b are electrically connected with a pivot driver 102b of the exposure controller 102, and when a voltage is applied to the electrode, electrostatic adsorption force acts between the electrode and the deflection mirror surface 651 so that one edge portion of the deflection mirror surface 651 is pulled toward the electrode. Hence, alternate application of a predetermined voltage from the pivot driver 102b upon the electrodes 658a and 658b vibrates the deflection mirror surface 651 reciprocally about the pivot axis AX which are the torsion springs 654. When the drive frequency for obtaining the reciprocal vibrations is set to the resonance frequency of the deflection mirror surface 651, the deflection mirror surface 651 vibrates at a large amplitude and the edge portions of the deflection mirror surface 651 consequently get displaced to positions which are in the vicinity of the electrodes 658a and 658b. Further, as the edge portions of the deflection mirror surface 651 reach the positions close to the electrodes 658a and 658b owing to resonance, the electrodes 658a and 658b contributes to driving of the deflection mirror surface 651, and the edge portions of the deflection mirror surface 651 and the both electrodes disposed on a flat surface accordingly make it possible to more stably maintain the vibrations.

Although the foregoing has described that electrostatic adsorption force reciprocally vibrates the deflection mirror surface 651 according to this embodiment, electromagnetic force may be used to vibrate the deflection mirror surface 651. Driving of the deflection mirror surface 651 by means of electromagnetic force is already a well known technique, and hence, will not be described here.

The exposure unit 6 will be further described, referring back to FIGS. 3 and 4. The scanning light beam which is made scan by the deflector 65 as described above is emitted from the deflector 65 toward the photosensitive member 2, and this scanning light beam Ls is imaged on the photosensitive member 2 via the scanning lens 66 and the return mirror 67 which correspond to the "second optical system" of the present invention, and a spot of the light beam Ls is consequently formed on the surface of the photosensitive member. The scanning light beam Ls in this manner scans parallel to the main scanning direction X and a line-like latent image which elongates in the main scanning direction X is formed at a scan position on the photosensitive member 2 as shown in FIG. 5.

In this embodiment, at the start or end of the scanning light beam, return mirrors 69a through 69c guide the scanning light beam from the deflector 65 to the synchronization sensor 60 as shown in FIG. 3. In short, in this embodiment, the synchronization sensor 60 functions as a horizontal synchronization reading sensor which is for obtaining a synchronizing signal in the main scanning direction X, namely, a horizontal synchronizing signal.

A specific structure used in this embodiment for the purpose of mitigating the beam rotation phenomenon will now be described in detail with reference to FIGS. 4, 9A through 9F and 10A through 10C. FIGS. 9A through 9F are drawings which show how the deflector makes the light beam scan, while FIGS. 10A through 10C are drawings which show the shape of a spot of the incident light beam on the deflection mirror surface. In this embodiment, the light beam Li impinging upon the deflection mirror surface 651 from the laser source 62 is a parallel flux whose cross sectional shape is approximately oval, and impinges upon the deflection mirror surface 651 from the front side.

Now, a description will be given on operations of deflecting the light beam as they are when a pivot angle θ becomes zero and the maximum angles (+θ max) and (−θ max). In FIGS. 9A through 9F (also in FIGS. 12A through 12F and FIGS. 16A through 16F which will be described later), the symbol SL denotes an intersecting line which is formed as the deflection mirror surface 651 intersects the reference surface SS at a position of incidence of the light beam Li upon the deflection mirror surface 651, namely, the "reference line" of the present invention. In this embodiment, a direction which is orthogonal to the intersecting line SL within the deflection mirror surface 651 is defined to be a mirror width direction.

First, when the pivot angle θ is zero (when the optical axis OAi of the incident light beam Li is orthogonal to the reference line SL in this embodiment), a beam spot BSi as that shown in FIG. 10B is formed on the deflection mirror surface 651. In this embodiment, in the mirror width direction Y, the size Hbs of the spot of the incident light beam Li is larger than the width Hb of the deflection mirror surface 651. That is, the deflection mirror surface 651 is overfilled with the incident light beam Li, and therefore, only a central portion of the incident light beam Li is reflected by the deflection mirror surface 651 and guided as the scanning light beam Ls to the scanning lens 66. In this case (where the deflection angle θ is zero), without any beam rotation, the central axis CLi of the incident light beam Li perfectly coincides with the central axis CLs of the outgoing light beam (scanning light beam) Ls and these approximately coincide with the reference line SL.

As the deflection mirror surface 651 pivots and the pivot angle θ grows, as shown in FIGS. 9D and 9F, the deflection mirror surface 651 reflects the central portion of the incident light beam Li at the same height and the same position as the reference surface SS while reflecting one portion of the incident light beam Li mostly at a section below the reference surface SS and the other portion of the incident light beam Li mostly at a section above the reference surface SS. When the pivot angle θ becomes the maximum angle (+θ max), as shown in FIG. 10A, the beam spot BSi of the incident light beam Li on the deflection mirror surface 651 largely rotates, with the central axis CLi of the incident light beam Li greatly tilted with respect to the reference line SL. Due to this phenomenon, beam rotation occurs. As for this mechanism, beam rotation similarly occurs also because of pivoting in the opposite direction (FIG. 10C).

By the way, in this embodiment, since the spot size Hbs of the incident light beam Li is larger than the width Hb of the deflection mirror surface 651 when the pivot angle θ is zero as described above, the relationship below is satisfied even when the pivot angle θ is other than zero:

$$Hbs > Hb$$

Owing to this, the deflection mirror surface 651 is overfilled with the incident light beam Li, and only a central portion of the incident light beam Li is reflected by the deflection mirror surface 651 and guided as the scanning light beam Ls to the scanning lens 66. Hence, upon beam rotation, the central axis CLs of the outgoing light beam (scanning light beam) Ls becomes close to the central axis CLs as it is when the pivot angle θ is zero (FIG. 10B). In other words, even though the incident light beam Li rotates largely, rotation of the scanning light beam Ls is mitigated. This also mitigates rotation of the beam spot on the surface of the photosensitive member 2.

Further, in this embodiment, even when the pivot angle θ becomes the maximum angle (+θ max) or (−θ max), the length Has of the spot of the incident light beam Li is shorter than the length Ha of the deflection mirror surface 651 in the main scanning direction X as shown in FIGS. 10A and 10C. Hence, it is possible to securely prevent the incident light beam Li from spreading outside the deflection mirror surface 651 in the main scanning direction X within the range of scanning, and hence, efficiently deflect the light beam on the surface of the photosensitive member 2. In consequence, it is possible to form a bright beam spot on the surface of the photosensitive member across the entire range of scanning. In addition, the volume of the flux reflected by the deflection mirror surface 651 (the shadowed areas in FIGS. 10A through 10C) varies less regardless of the value of the pivot angle θ, and hence, obtain an approximately uniform amount of light all over the range of scanning.

As described above, in this embodiment, although the light beam Li is obliquely incident upon the deflection mirror surface 651, since the deflection mirror surface 651 is overfilled with the incident light beam Li in the mirror width direction Y, the light beam scans on the surface of the photosensitive member 2 with an excellent scanning characteristic while suppressing rotation of the beam spot. In consequence, a latent image is formed stably on the surface of the photosensitive member 2.

To ensure that the deflection mirror surface 651 is smaller than the beam spot BSi of the incident light beam Li in the mirror width direction Y and thereby attain the overfilled state described above, the movable plate 653 is finished in the shape of an elongated strip and the width Hb in the mirror width direction Y is therefore remarkably narrower in this embodiment than in conventional apparatuses. Hence, in the exposure unit 6 having such a structure, the movable plate 653 is light-weighted and accordingly caused to pivot at a high speed in a stable manner than in conventional apparatuses. The light beam thus stably scans on the surface of the photosensitive member 2 at a high speed, whereby a latent image is formed in a stable manner.

<Second Preferred Embodiment>

Figure 11:
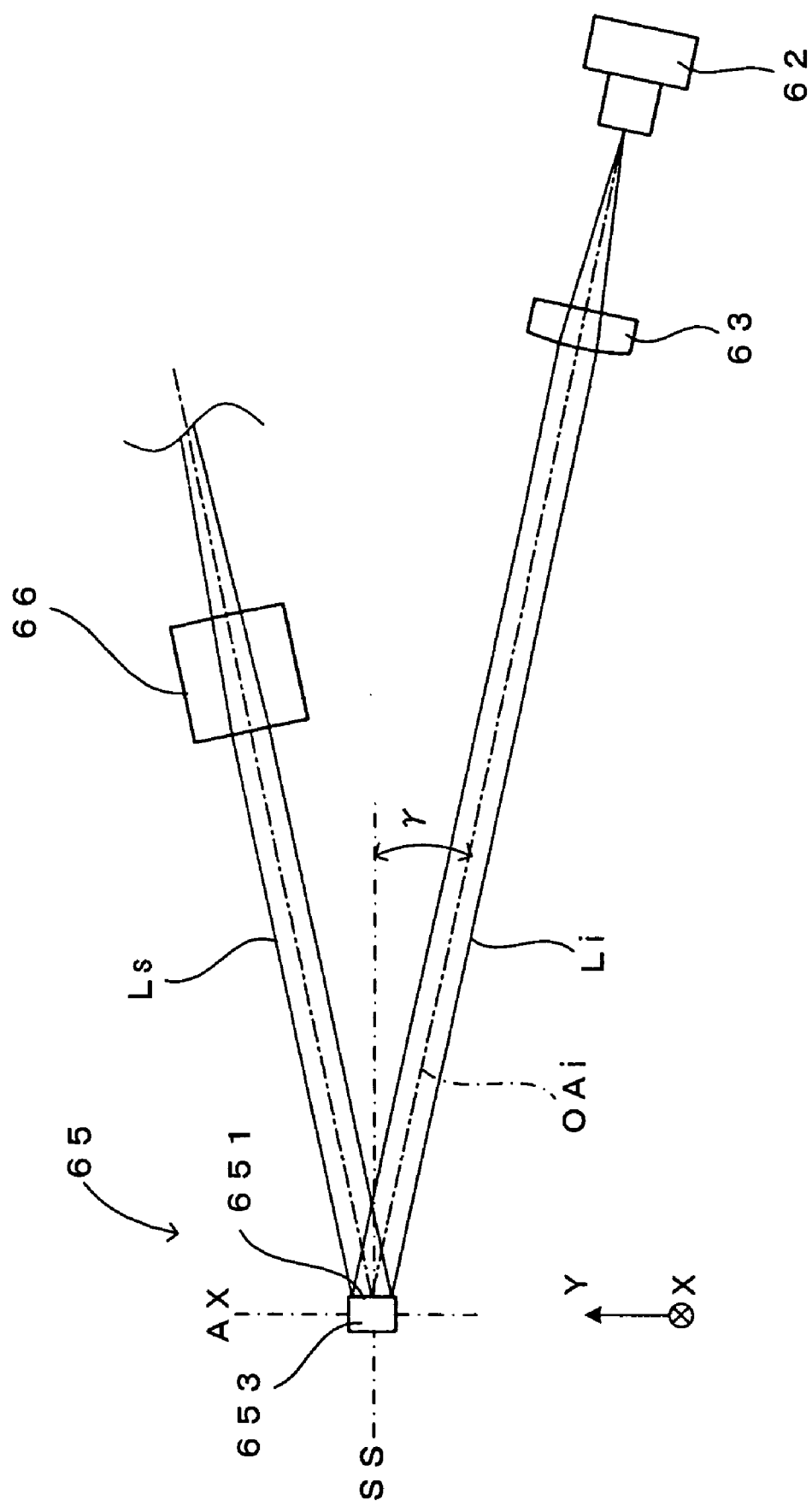
FIG. 11 is a sub-scanning cross sectional view of the exposure unit which is disposed to an image forming apparatus according to a second embodiment of the present invention.

FIG. 11 is a sub-scanning cross sectional view of the exposure unit which is disposed to an image forming apparatus according to a second embodiment of the present invention. Other basic structure is approximately the same as that according to the first embodiment, and will therefore be denoted at the same reference symbols but will not be described. FIGS. 12A through 12F are drawings which show how the deflector makes a light beam scan in the second embodiment. FIGS. 13A through 13C are drawings which show the shape of a spot of the incident light beam on the deflection mirror surface in the second embodiment. A specific structure used in this embodiment for the purpose of mitigating the beam rotation phenomenon will now be described in detail with reference to FIGS. 11, 12A through 12F and 13A through 13C. In this embodiment, the light beam Li incident upon the deflection mirror surface 651 from the laser source 62 is a parallel flux whose cross sectional shape is approximately oval, and impinges upon the deflection mirror surface 651 from the front side. A description will be given on operations of deflecting the light beam as they are when the pivot angle θ becomes zero and the maximum angles (+θ max) and (−θ max).

First, when the pivot angle θ is zero (when the optical axis OAi of the incident light beam Li is orthogonal to the reference line SL in this embodiment), the beam spot BSi as that shown in FIG. 13B is formed on the deflection mirror surface 651. In this embodiment, in the mirror width direction Y, the size Hb of the deflection mirror surface 651 and the size Hbs of the beam spot BSi on the deflection mirror surface 651 satisfy the two conditions below:

(2-1) Within the range of scanning, and when the optical axis OAi of the incident light beam Li and the reference line SL are at right angles, the spot size Hbs of the incident light beam Li on the deflection mirror surface 651 is equal to or smaller than the width Hb of the deflection mirror surface 651; and (2-2) Within the range of scanning, and when the angle above reaches a maximum value or a minimum value, the spot size Hbs of the incident light beam Li on the deflection mirror surface 651 is larger than the width Hb of the deflection mirror surface 651.

The meanings of the conditions (2-1) and (2-2) will now be described. Under the condition (2-1), the optical axis OAi of the incident light beam Li and the reference line SL are at right angles, and no beam rotation occurs. Further, since the inequality below is satisfied, all of the incident light beam Li is reflected by the deflection mirror surface 651 in the mirror width direction Y and then imaged on the photosensitive member 2 via the scanning lens 66 and the return mirror 67, whereby a spot of the scanning light beam Ls is formed on the surface of the photosensitive member:

Hbs≦Hb

Hence, the light beam emitted from the laser source 62 is efficiently imaged on the surface of the photosensitive member 2 and a bright beam spot is thus formed on the surface of the photosensitive member.

As the pivot angle θ of the deflection mirror surface 651 changes from zero, the deflection mirror surface 651 gets displaced and the angle between the optical axis OAi of the incident light beam Li and the reference line SL accordingly increases or decreases from the right angle. For example, as shown in FIGS. 12D through 12F, the above-mentioned angle there-between (that is, between the optical axis OAi of the incident light beam Li and the reference line SL) decreases in accordance with an increase of the pivot angle θ, and the above-mentioned angle becomes (90-θ max) which is a minimum value at the end of the range of scanning, i.e., when the pivot angle θ reaches its maximum value (+θ max). Beam rotation occurs in accordance with such a change of the above-mentioned angle. In other words, although the deflection mirror surface 651 reflects a central portion of the incident light beam Li at the same height as the reference surface SS, depending upon a change of the above-mentioned angle, one portion of the incident light beam Li is lopsided toward below the reference surface SS and reflected there by the deflection mirror surface 651 whereas the other portion of the incident light beam Li is lopsided toward above the reference surface SS and reflected there by the deflection mirror surface 651. This brings about beam rotation, and when the pivot angle θ becomes the maximum angle (+θ max) for instance, as shown in FIG. 13A, the beam spot BSi of the incident light beam Li on the deflection mirror surface 651 greatly rotates. At this stage, the central axis CLi of the incident light beam Li is largely tilted with respect to the reference line SL. This similarly occurs when pivoting is in the opposite direction (FIG. 13C).

By the way, in this embodiment, since the condition (2-2) is also satisfied in addition to the condition (2-1), while the pivot angle θ is increasing or when the pivot angle θ reaches its maximum value, the spot size Hbs of the incident light beam Li exceeds the width Hb of the deflection mirror surface 651 in the mirror width direction Y Once the relationship below is met, the deflection mirror surface 651 becomes overfilled with the incident light beam Li and only a portion of the incident light beam Li is deflected:

Hbs>Hb

That is, although the deflection mirror surface 651 reflects a central portion of the incident light beam Li at the same height as the reference surface SS, one portion of the incident light beam Li is lopsided toward below the reference surface SS and reflected, as it lacks a lower portion, by the deflection mirror surface 651 while the other portion of the incident light beam Li is lopsided toward above the reference surface SS and reflected, as it lacks an upper portion, by the deflection mirror surface 651. In consequence, in the overfilled state, the central axis CLs of the outgoing light beam (scanning light beam) Ls becomes close to the central axis CLs as it is when the pivot angle θ is zero (FIG. 13B). In other words, even though the incident light beam Li remarkably rotates, rotation of the scanning light beam Ls is eased. This also mitigates rotation of the beam spot on the surface of the photosensitive member 2.

Further, in this embodiment, even when the pivot angle θ becomes the maximum angle (+θ max) or (−θ max), the length Has of the spot of the incident light beam Li is shorter than the length Ha of the deflection mirror surface 651 in the main scanning direction X as shown in FIGS. 13A and 13C. Hence, it is possible to securely prevent the incident light beam Li from spreading outside the deflection mirror surface 651 in the main scanning direction X within the range of scanning, and hence, efficiently deflect the light beam onto the surface of the photosensitive member 2.

As described above, in this embodiment, although the incident light beam Li is obliquely incident upon the deflection mirror surface 651, since the deflection mirror surface 651 is overfilled with the incident light beam Li in the mirror width direction Y at the ends of the range of scanning, the light beam scans on the surface of the photosensitive member 2 with an excellent scanning characteristic while suppressing rotation of the beam spot. In consequence, a latent image is formed stably on the surface of the photosensitive member 2.

In addition, to ensure that the deflection mirror surface 651 is smaller than the beam spot BSi of the incident light beam Li in the mirror width direction Y and thereby satisfy the condition (2-2) described above, the movable plate 653 is finished in the shape of an elongated strip and the width Hb in the mirror width direction Y is therefore remarkably narrower in this embodiment than in conventional apparatuses. Hence, in the exposure unit 6 having such a structure, the movable plate 653 is light-weighted and accordingly caused to pivot at a high speed in a stable manner than in conventional apparatuses. The light beam thus stably scans on the surface of the photosensitive member 2 at a high speed, whereby a latent image is formed in a stable manner.

<Third Preferred Embodiment>

Figure 14:
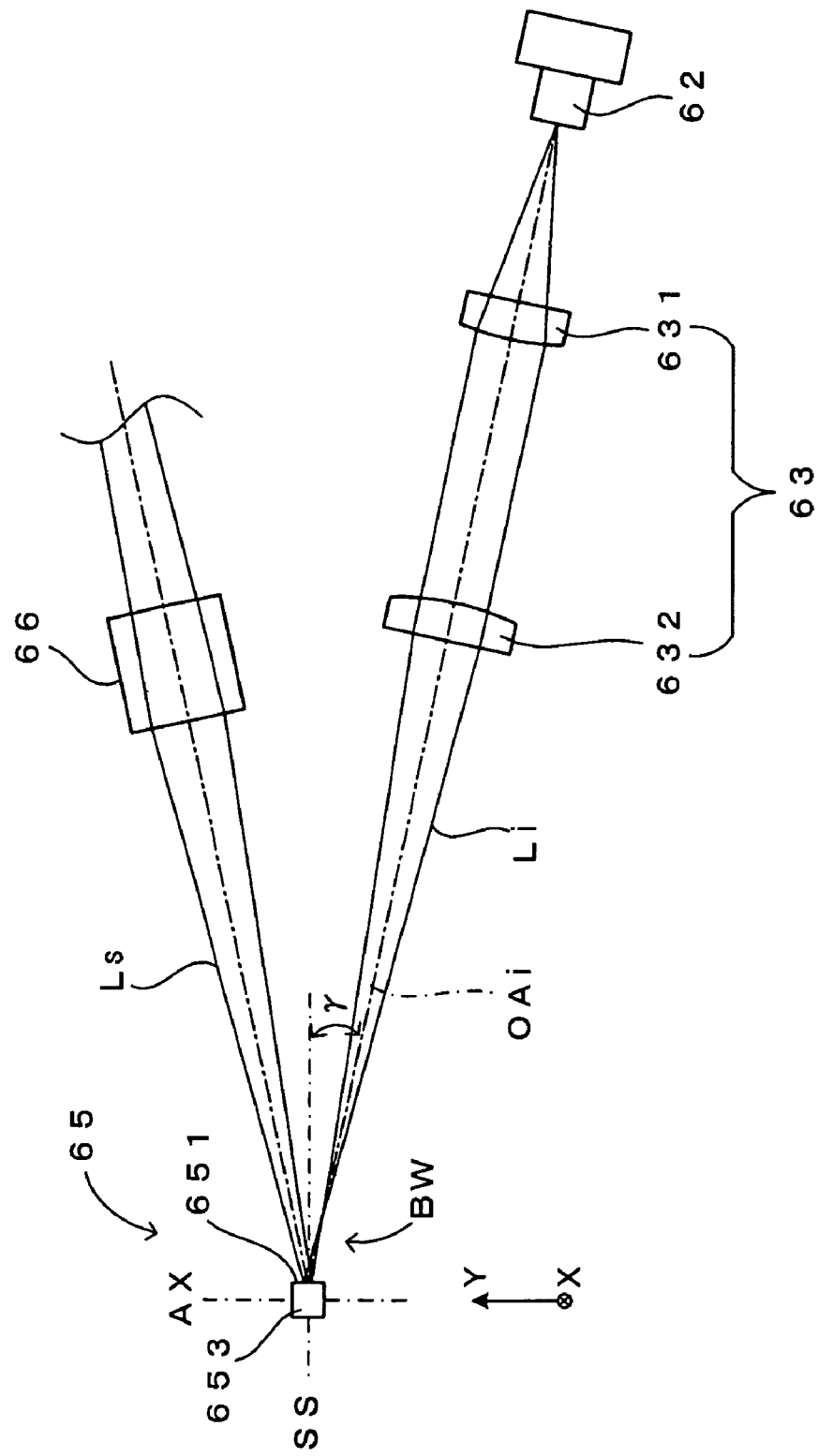
FIG. 14 is a sub-scanning cross sectional view of the exposure unit which is disposed to an image forming apparatus according to a third embodiment of the present invention.
Figure 15:
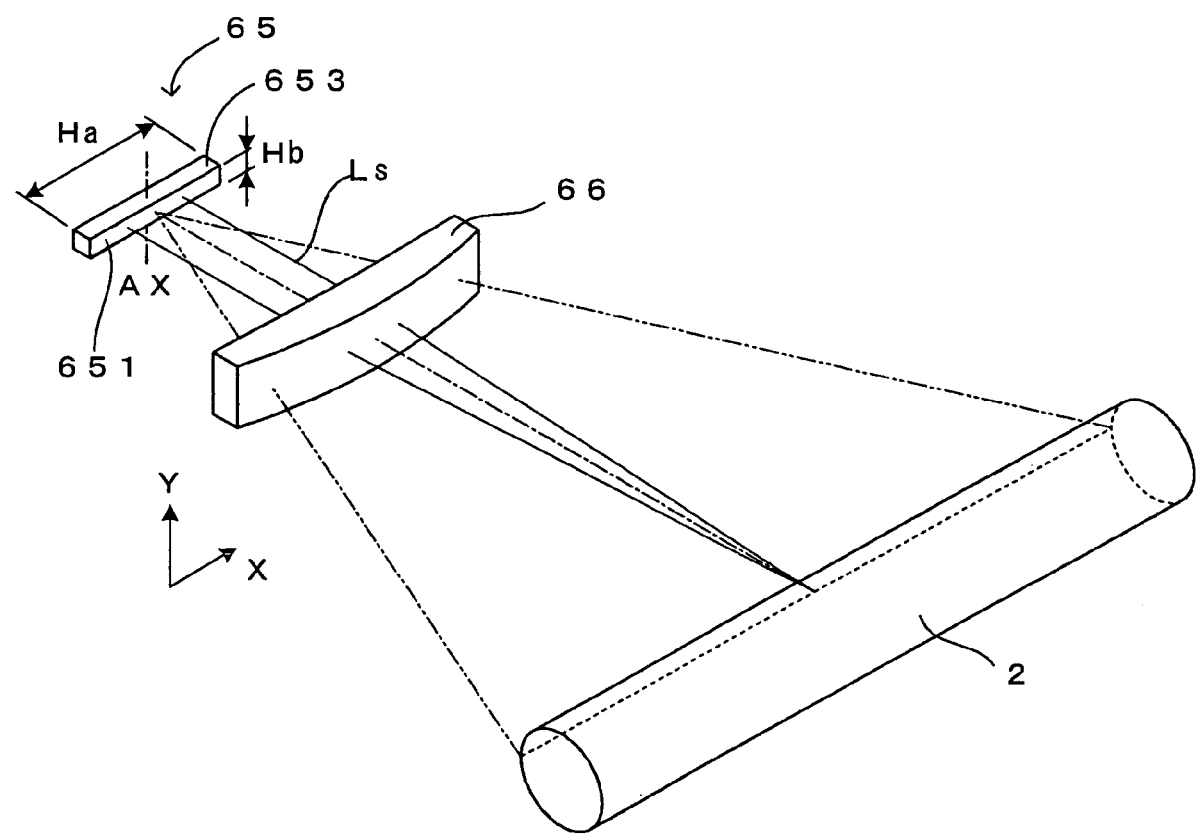
FIG. 15 is a perspective view which shows imaging of a deflected light beam in the third embodiment.

FIG. 14 is a sub-scanning cross sectional view of the exposure unit which is disposed to an image forming apparatus according to a third embodiment of the present invention. FIG. 15 is a perspective view which shows imaging of a deflected light beam in the third embodiment. In the apparatus according to the third embodiment, to make the light beam emitted from the laser source 62 scan and expose the surface of the photosensitive member 2 (surface-to-be-scanned), a collimator lens 631, a cylindrical lens 632, the mirror 64, the deflector 65, the first scanning lens 66 and the return mirror 67 are disposed inside the exposure housing 61. In other words, after shaped into collimated light of a proper size by the collimator lens 631, the light beam from the laser source 62 impinges upon the cylindrical lens 632 which has power only in the sub scanning direction Y as shown in FIG. 14. This collimated light is converged only in the sub scanning direction Y and imaged in the form of a line in the vicinity of the deflection mirror surface 651 of the deflector 65. In this embodiment, the collimator lens 631 and the cylindrical lens 632 thus function as a beam shaping system (first optical system) 63 which converges the light beam emitted from the laser source 62 in the sub scanning direction Y The beam shaping system 63 further makes the converging light beam Li impinge upon the deflection mirror surface 651 at the acute angle γ with respect to the reference surface SS which is orthogonal to the pivot axis (which corresponds to the "drive axis" of the present invention) AX of the deflection mirror surface 651 of the deflector 65 as shown in FIG. 14.

The scanning light beam caused to scan by the deflector 65 travels from the deflector 65 toward the photosensitive member 2 and the scanning lens 66 and the return mirror 67 which correspond to the "second optical system" of the present invention focus this scanning light beam Ls on the photosensitive member 2, whereby a spot of the scanning light beam Ls is formed on the surface of the photosensitive member. As a result, as shown in FIG. 15, the scanning light beam Ls scans parallel to the main scanning direction X and a line-like latent image which elongates in the main scanning direction X is formed at the scan position on the photosensitive member 2. Other basic structure is approximately the same as that according to the first embodiment, and will therefore be denoted at the same reference symbols but will not be described.

A specific structure used in this embodiment for the purpose of mitigating the beam rotation phenomenon will now be described in detail with reference to FIGS. 14, 16A through 16F, 17A through 17C and 18A through 18C. FIGS. 16A through 16F are drawings which show how the deflector makes a light beam scan. FIGS. 17A through 17C are drawings which show reflection of a light beam on the deflection mirror surface as viewed from the line P—P which is shown in FIG. 16B. FIGS. 18A through 18C are drawings which show the shape of a spot of the light beam on the deflection mirror surface. In this embodiment, the light beam Li incident upon the deflection mirror surface 651 from the laser source 62 is a converging light beam whose cross sectional shape is approximately oval and which impinges upon the deflection mirror surface 651 from the front side. A beam waist BW of the converging light beam Li is formed outside the range of displacement of the deflection mirror surface 651, as shown in FIGS. 17A through 17C. That is, regardless of the pivot angle of the deflection mirror surface 651, the beam waist BW is formed always at a position which is off from the deflection mirror surface 651.

A description will now be given on operations of deflecting the light beam as they are when the pivot angle θ becomes zero and the maximum angles (+θ max) and (−θ max). First, when the pivot angle θ is zero (when the optical axis OAi of the incident light beam Li is orthogonal to the reference line SL in this embodiment), the beam spot BSi as that shown in FIG. 18B is formed on the deflection mirror surface 651. In this embodiment, in the mirror width direction Y, the size Hb of the deflection mirror surface 651 and the size Hbs of the beam spot BSi on the deflection mirror surface 651 satisfy the two conditions below:

(3-1) Within the range of scanning, and when the optical axis OAi of the incident light beam Li and the reference line SL are at right angles, the spot size Hbs of the incident light beam Li on the deflection mirror surface 651 is equal to or smaller than the width Hb of the deflection mirror surface 651; and (3-2) Within the range of scanning, and when the angle above reaches a maximum value or a minimum value, the spot size Hbs of the incident light beam Li on the deflection mirror surface 651 is larger than the width Hb of the deflection mirror surface 651.

The meanings of the conditions (3-1) and (3-2) will now be described. Under the condition (3-1), the optical axis OAi of the incident light beam Li and the reference line SL are at right angles, and no beam rotation occurs. Further, since the inequality below is satisfied, all of the incident light beam Li is reflected by the deflection mirror surface 651 in the mirror width direction Y and then imaged on the photosensitive member 2 via the scanning lens 66 and the return mirror 67, whereby a spot of the scanning light beam Ls is formed on the surface of the photosensitive member:

Hbs≦Hb

Hence, the light beam emitted from the laser source 62 is efficiently imaged on the surface of the photosensitive member 2 and a bright beam spot is thus formed on the surface of the photosensitive member.

As the pivot angle θ of the deflection mirror surface 651 changes from zero, the deflection mirror surface 651 gets displaced and the angle between the optical axis OAi of the incident light beam Li and the reference line SL accordingly increases or decreases from the right angle. For example, as shown in FIGS. 16D through 16F, the above-mentioned angle there-between (that is, between the optical axis OAi of the incident light beam Li and the reference line SL) decreases in accordance with an increase of the pivot angle θ, and the above-mentioned angle becomes (90-θ max) which is a minimum value at the end of the range of scanning, i.e., when the pivot angle θ reaches its maximum value (+θ max). Beam rotation occurs in accordance with such a change of the above-mentioned angle. In other words, although the deflection mirror surface 651 reflects a central portion of the incident light beam Li at the same height as the reference surface SS, depending upon the change of the above-mentioned angle, one portion of the incident light beam Li is lopsided toward below the reference surface SS and reflected there by the deflection mirror surface 651 whereas the other portion of the incident light beam Li is lopsided toward above the reference surface SS and reflected there by the deflection mirror surface 651. This brings about beam rotation, and when the pivot angle θ becomes the maximum angle (+θ max) for instance, as shown in FIG. 18A, the beam spot BSi of the incident light beam Li on the deflection mirror surface 651 greatly rotates. At this stage, the central axis CLi of the incident light beam Li is largely tilted with respect to the reference line SL. This similarly occurs when pivoting is in the opposite direction (FIG. 18C).

By the way, in this embodiment, since the condition (3-2) is also satisfied in addition to the condition (3-1), while the pivot angle θ is increasing or when the pivot angle θ reaches its maximum value, the spot size Hbs of the incident light beam Li exceeds the width Hb of the deflection mirror surface 651 in the mirror width direction Y Once the relationship below is met, the deflection mirror surface 651 becomes overfilled with the incident light beam Li and only a portion of the incident light beam Li is deflected:

Hbs>Hb

That is, although the deflection mirror surface 651 reflects a central portion of the incident light beam Li at the same height as the reference surface SS, one portion of the incident light beam Li is lopsided toward below the reference surface SS and reflected, as it lacks a lower portion, by the deflection mirror surface 651 while the other portion of the incident light beam Li is lopsided toward above the reference surface SS and reflected, as it lacks an upper portion, by the deflection mirror surface 651. In consequence, in the overfilled state, the central axis CLs of the outgoing light beam (scanning light beam) Ls becomes close to the central axis CLs as it is when the pivot angle θ is zero (FIG. 18B). In other words, even though the incident light beam Li remarkably rotates, rotation of the scanning light beam Ls is eased. This also mitigates rotation of the beam spot on the surface of the photosensitive member 2.

Further, in this embodiment, even when the pivot angle θ becomes the maximum angle (+θ max) or (−θ max), the length Has of the spot of the incident light beam Li is shorter than the length Ha of the deflection mirror surface 651 in the main scanning direction X as shown in FIGS. 18A and 18C. Hence, it is possible to securely prevent the incident light beam Li from spreading outside the deflection mirror surface 651 in the main scanning direction X within the range of scanning, and hence, efficiently deflect the light beam on the surface of the photosensitive member 2.

As described above, in this embodiment, although the incident light beam Li is obliquely incident upon the deflection mirror surface 651, since the deflection mirror surface 651 is overfilled with the incident light beam Li in the mirror width direction Y at the ends of the range of scanning, the light beam scans on the surface of the photosensitive member 2 with an excellent scanning characteristic while suppressing rotation of the beam spot. In consequence, a latent image is formed stably on the surface of the photosensitive member 2.

In addition, to ensure that the deflection mirror surface 651 is smaller than the beam spot BSi of the incident light beam Li in the mirror width direction Y and thereby satisfy the condition (3-2) described above, the movable plate 653 is finished in the shape of an elongated strip and the width Hb in the mirror width direction Y is therefore remarkably narrower in this embodiment than in conventional apparatuses. Hence, in the exposure unit 6 having such a structure, the movable plate 653 is light-weighted and accordingly caused to pivot at a high speed in a stable manner than in conventional apparatuses. The light beam thus stably scans on the surface of the photosensitive member 2 at a high speed, whereby a latent image is formed in a stable manner.

<Fourth Preferred Embodiment>

By the way, the beam waist BW of the converging light beam Li emitted from the beam shaping system 63 may be formed at any desired position, and the beam shaping system 63 may be structured such that the beam waist BW will be formed at a position which is nearer to the deflection mirror surface 651 than the beam waist BW according to the third embodiment (FIGS. 17A through 17C) is. A fourth embodiment will now be described with reference to FIGS. 19A through 19C and 20A through 20C.

FIGS. 19A through 19C are drawings of a portion of an exposure unit which is disposed to an image forming apparatus according to the fourth embodiment of the present invention, showing reflection of a light beam on the deflection mirror surface as viewed from the line P—P which is shown in FIG. 16B. FIGS. 20A through 20C are drawings which show the shape of a spot of the light beam on the deflection mirror surface. The image forming apparatus according to this embodiment is different from the apparatus according to the third embodiment only with respect to the beam waist BW of the converging light beam Li, but is otherwise the same as the apparatus according to the third embodiment.

In the fourth embodiment, the beam waist BW of the converging light beam Li is formed within the range of displacement of the deflection mirror surface 651, as shown in FIGS. 19A through 19C. That is, while the deflection mirror surface 651 is pivoting and getting displaced, the beam waist BW comes to be positioned on the deflection mirror surface 651. Owing to this, the shape of the beam spot BSi formed on the deflection mirror surface 651 is partially different from that according to the third embodiment.

First, when the pivot angle θ is zero (when the optical axis OAi of the incident light beam Li is orthogonal to the reference line SL in this embodiment), the beam spot BSi as that shown in FIG. 20B is formed on the deflection mirror surface 651. In this embodiment, in the mirror width direction Y, the size Hb of the deflection mirror surface 651 and the size Hbs of the beam spot BSi on the deflection mirror surface 651 satisfy the two conditions (3-1) and (3-2) described above in the third embodiment. Hence, the optical axis OAi of the incident light beam Li and the reference line SL are right angles and there is no beam rotation since the pivot angle θ is zero. Further, since the inequality below is satisfied, all of the incident light beam Li is reflected by the deflection mirror surface 651 in the mirror width direction Y and then imaged on the photosensitive member 2 via the scanning lens 66 and the return mirror 67, whereby a spot of the scanning light beam Ls is formed on the surface of the photosensitive member:

$$Hbs \leq Hb$$

Hence, the light beam emitted from the laser source 62 is efficiently imaged on the surface of the photosensitive member 2 and a bright beam spot is thus formed on the surface of the photosensitive member.

As the pivot angle θ of the deflection mirror surface 651 changes from zero, the deflection mirror surface 651 gets displaced, the angle between the optical axis OAi of the incident light beam Li and the reference line SL accordingly increases or decreases from the right angle and beam rotation occurs, as in the third embodiment. For example, as shown in FIG. 20A, when the pivot angle θ becomes the maximum angle (+θ max), the beam spot BSi of the incident light beam Li on the deflection mirror surface 651 greatly rotates. At this stage, the central axis CLi of the incident light beam Li is largely tilted with respect to the reference line SL. This similarly occurs when pivoting is in the opposite direction (FIG. 20C).

However, in this embodiment as well, since the conditions (3-1) and (3-2) are satisfied, rotation of the beam spot on the surface of the photosensitive member 2 is eased for a similar reason to that according to the third embodiment. In addition, as shown in FIGS. 20A and 20C, even when the pivot angle θ becomes the maximum angle (+θ max) or (−0 max), the length Has of the spot of the incident light beam Li is shorter than the length Ha of the deflection mirror surface 651 in the main scanning direction X. Hence, it is possible to securely prevent the incident light beam Li from spreading outside the deflection mirror surface 651 in the main scanning direction X within the range of scanning, and hence, efficiently deflect the light beam onto the surface of the photosensitive member 2.

Still further, since the beam waist BW is formed within the range of displacement of the deflection mirror surface 651 in the structure according to this embodiment, variations of the amount of light within the range of scanning are suppressed better than in the third embodiment. This is because the beam waist BW of the converging light beam Li is located on the deflection mirror surface 651 while the deflection mirror surface 651 is getting displaced. In short, the beam spot BSi of the incident light beam Li on the deflection mirror surface 651 is shaped approximately like a gourd, i.e., constricted at the location of the beam waist BW as shown in FIGS. 20A and 20C. This reduces the amount of overfilling of the beam spot BSi which is outside the deflection mirror surface 651 than in the third embodiment and hence increases the amount of light which is reflected by the deflection mirror surface 651. In consequence, the reduction amount of light at the ends of the range of scanning is suppressed and therefore variations of the amount of light within the range of scanning are suppressed.

<Others>

The present invention is not limited to the embodiments above, but may be modified in various manners in addition to the preferred embodiments above, to the extent not deviating from the object of the invention. For instance, the present invention is applicable to an exposure unit in which a light beam is obliquely incident upon the deflector 65 which may be a conventional deflector such as a galvanometer mirror and a polygon mirror.

Further, in the embodiments above, although a light beam is incident upon the deflection mirror surface 651 from a front side of the deflection mirror surface 651, the present invention is not limited to this. Instead, the present invention is generally applicable to any exposure unit in which a light beam is obliquely incident upon the deflection mirror surface 651 from one side (or from below) or from the other side (or from above) with respect to the reference surface SS.

Although the optical scanning apparatus according to the present invention is used as an exposure unit of a color image forming apparatus, the present invention is not limited to this. In other words, the optical scanning apparatus according to the present invention may be used as an exposure unit of an image forming apparatus in which a light beam scans on a latent image carrier such as a photosensitive member to thereby form an electrostatic latent image, the electrostatic latent image is developed with toner and a toner image is formed. Of course, the application of the optical scanning apparatus is not limited to an exposure unit which is disposed to an image forming apparatus, but generally includes any optical scanning apparatus which makes a light beam scan on a surface-to-be-scanned.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An optical scanning apparatus which makes a light beam scan on a surface-to-be-scanned in a main scanning direction, comprising:
   a deflector which comprises a deflection mirror surface reflecting an incident light beam, and displaces said deflection mirror surface about a drive axis which is approximately orthogonal to the main scanning direction, thereby deflecting the incident light beam in the main scanning direction;
   a light source which emits the light beam;
   a first optical system which shapes the light beam from said light source and makes the light beam impinge upon said deflection mirror surface at an acute angle with respect to a reference surface which is orthogonal to the drive axis, and from above or below relative to the reference surface in a direction of the drive axis; and
   a second optical system which makes the light beam form an image on the surface-to-be-scanned, wherein
   an intersecting line which is formed as said deflection mirror surface intersects the reference surface at the position of incidence of the incident light beam upon said deflection mirror surface is a reference line, and a direction which is orthogonal to the main scanning direction is a mirror width direction, and
   said first optical system shapes the light beam from said light source so that the size of a spot of the incident light beam formed on said deflection mirror surface is larger than the width of said deflection mirror surface in the mirror width direction, when an optical axis of the incident light beam is orthogonal to the reference line.

2. An optical scanning apparatus which makes a light beam scan on a surface-to-be-scanned in a main scanning direction, comprising:
   a deflector which comprises a deflection mirror surface reflecting an incident light beam, and displaces said deflection mirror surface about a drive axis which is approximately orthogonal to the main scanning direction, thereby deflecting the incident light beam in the main scanning direction within a predetermined range of scanning;
   a light source which emits the light beam;
   a first optical system which shapes the light beam from said light source and makes the light beam impinge upon said deflection mirror surface at an acute angle with respect to a reference surface which is orthogonal to the drive axis, and from above or below relative to the reference surface in a direction of the drive axis; and
   a second optical system which makes the light beam form an image on the surface-to-be-scanned, wherein
   an intersecting line which is formed as said deflection mirror surface intersects the reference surface at the position of incidence of the incident light beam upon said deflection mirror surface is a reference line, and a direction which is orthogonal to the main scanning direction is a mirror width direction, and
   said first optical system shapes the light beam from said light source so that conditions (i) and (ii) are fulfilled:
   (i) the size of a spot of the incident light beam formed on said deflection mirror surface in the mirror width direction is equal to or smaller than the width of said deflection mirror surface in the mirror width direction, within the range of scanning and when an angle between an optical axis of the incident light beam and the reference line is a right angle, and
   (ii) the size of a spot of the incident light beam formed on said deflection mirror surface in the mirror width direction is larger than the width of said deflection mirror surface in the mirror width direction, within the range of scanning and when the angle there-between reaches a maximum value or a minimum value.

3. The optical scanning apparatus of claim 1, wherein
   said first optical system shapes the light beam from said light source into a parallel flux and makes the parallel flux impinge upon said deflection mirror surface as the incident light beam.

4. An optical scanning apparatus which makes a light beam scan on a surface-to-be-scanned in a main scanning direction, comprising:
   a deflector which comprises a deflection mirror surface reflecting an incident light beam, and displaces said deflection mirror surface about a drive axis which is approximately orthogonal to the main scanning direction, thereby deflecting the incident light beam in the main scanning direction within a predetermined range of scanning;

a light source which emits the light beam;

a first optical system which converges the light beam from said light source in a sub scanning direction which is approximately orthogonal to the main scanning direction, and makes the light beam impinge upon said deflection mirror surface at an acute angle with respect to a reference surface which is orthogonal to the drive axis, and from above or below relative to the reference surface in a direction of the drive axis; and a second optical system which makes the light beam form an image on the surface-to-be-scanned, wherein an intersecting line which is formed as said deflection mirror surface intersects the reference surface at the position of incidence of the incident light beam upon said deflection mirror surface is a reference line, and a direction which is orthogonal to the main scanning direction is a minor width direction, and said first optical system shapes the light bean from said light sources so that conditions (i) and (ii) are fulfilled:

(i) the size of a spot of the incident light beam formed on said deflection mirror surface in the mirror width direction is equal to or smaller than the width of said deflection mirror surface in the mirror width direction, within the range of scanning and when an angle between an optical axis of the incident light beam and the reference line is a right angle, and (ii) the size of a spot of the incident light beam formed on said deflection minor surface in the mirror width direction is larger than the width of said deflection mirror surface in the mirror width direction, within the range of scanning and when the angle there-between reaches a maximum value or a minimum value.

5. The optical scanning apparatus of claim 4, wherein said first optical system converges the light beam from said light source so that a beam waist of the converging light beam is outside the range of displacement of said deflection mirror surface.

6. The optical scanning apparatus of claim 4, wherein said first optical system converges the light beam from said light source so that a beam waist of the converging light beam is within the range of displacement of said deflection mirror surface.

7. The optical scanning apparatus of claim 1, wherein said first optical system makes the incident light beam impinge upon said deflection mirror surface from a front side of said deflection mirror surface.

8. The optical scanning apparatus of claim 1, wherein said deflector comprises a movable member having a shape of an elongated strip which extends in the main scanning direction and having said deflection mirror surface, and a support member which is formed integrally with said movable member and which supports said movable member in such a manner that said movable member can freely pivot about the drive axis, said deflector driving said movable member to pivot about the drive axis, thereby deflecting the incident light beam.

9. The optical scanning apparatus of claim 1, wherein said deflector deflects the incident light beam within a predetermined range of scanning, and the size of a spot of the incident light beam formed on said deflection minor surface in the main scanning direction is smaller than the length of said deflection mirror surface in the main scanning direction, within the range of scanning and when an angle between an optical axis of the incident light beam and the reference line reaches a maximum value or a minimum value.

10. An image farming apparatus, comprising:

said optical scanning apparatus of claim 1; and a latent image carrier, wherein said optical scanning apparatus makes the light beam scan on a surface of said latent image carrier, thereby forming an electrostatic latent image on said latent image carrier.

\* \* \* \* \*